US009668101B2

(12) United States Patent
Marri Sridhar et al.

(10) Patent No.: US 9,668,101 B2
(45) Date of Patent: May 30, 2017

(54) PARTIAL TIMING SYNCHRONIZATION FUNCTION (TSF) SYNCHRONIZATION IN FINE TIMING MEASUREMENT (FTM) PROTOCOL

(71) Applicant: QUALCOMM Incorporated, San Diego, CA (US)

(72) Inventors: Subash Marri Sridhar, San Jose, CA (US); Carlos Horacio Aldana, Mountain View, CA (US); Santosh Kumar Vamaraju, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/065,696

(22) Filed: Mar. 9, 2016

(65) Prior Publication Data

US 2017/0048671 A1  Feb. 16, 2017

Related U.S. Application Data

(60) Provisional application No. 62/203,306, filed on Aug. 10, 2015.

(51) Int. Cl.
*H04W 24/00* (2009.01)
*H04W 4/02* (2009.01)
(Continued)

(52) U.S. Cl.
CPC ........... *H04W 4/023* (2013.01); *H04L 5/0055* (2013.01); *H04W 56/001* (2013.01); *H04W 56/0015* (2013.01); *H04W 56/0065* (2013.01)

(58) Field of Classification Search
CPC ............. H04W 4/023; H04W 56/0015; H04W 56/001; H04W 56/0065; H04L 5/0055
See application file for complete search history.

(56) References Cited

U.S. PATENT DOCUMENTS 8,654,758 B2 * 2/2014 Zakrzewski ........ H04W 56/009
370/350
2008/0273521 A1 * 11/2008 Shao ................. H04W 56/0015
370/350

(Continued)

FOREIGN PATENT DOCUMENTS

CN      103081383 A      5/2013
WO    2015031031 A1    3/2015

OTHER PUBLICATIONS

Pearson, T. et al., "A Case for Assisted Partial Timing Support Using Precision Timing Protocol Packet Synchronization for LTE-A," IEEE Communications Magazine, Jul. 2014, pp. 2-9.

(Continued)

*Primary Examiner* — Ajit Patel
(74) *Attorney, Agent, or Firm* — Kilpatrick Townsend & Stockton, LLP

(57) ABSTRACT

Disclosed herein are techniques for timing synchronization between a first wireless device and a second wireless device. The techniques include sending a first message by the first wireless device to the second wireless device, obtaining a first timestamp at the first wireless device by the first wireless device, and receiving, by the first wireless device, a fine timing measurement frame from the second wireless device in response to the first message. The fine timing measurement frame includes at least a part of a second timestamp from the second wireless device. The techniques further include determining by the first wireless device that the first wireless device is not synchronized to the second wireless device based at least partially on the part of the second timestamp and the first timestamp.

31 Claims, 19 Drawing Sheets

(51) Int. Cl.
*H04W 56/00* (2009.01)
*H04L 5/00* (2006.01)

(56) References Cited

U.S. PATENT DOCUMENTS

| | | |
|---|---|---|
| 2012/0229334 A1 | 9/2012 | Waters et al. |
| 2012/0263195 A1* | 10/2012 | Li .................. G04G 7/02 370/510 |
| 2014/0073352 A1 | 3/2014 | Aldana et al. |
| 2014/0213193 A1* | 7/2014 | Zhang .............. G01S 11/02 455/67.11 |
| 2014/0254511 A1 | 9/2014 | Aldana et al. |
| 2014/0293851 A1 | 10/2014 | Abraham et al. |
| 2014/0341234 A1 | 11/2014 | Asterjadhi et al. |
| 2015/0036670 A1 | 2/2015 | Park |
| 2015/0049716 A1* | 2/2015 | Gutierrez .......... H04W 84/12 370/329 |
| 2015/0131628 A1* | 5/2015 | Chu ............. H04W 56/0015 370/336 |
| 2015/0139212 A1* | 5/2015 | Wang ................. G01S 5/06 370/338 |
| 2015/0350027 A1* | 12/2015 | Raissinia ........... H04B 17/318 455/517 |
| 2015/0365805 A1* | 12/2015 | Bajko ................ H04W 4/043 455/456.1 |
| 2016/0088497 A1* | 3/2016 | Segev ................ H04W 24/02 370/252 |
| 2016/0183171 A1* | 6/2016 | Hareuveni .......... H04W 64/00 370/328 |
| 2016/0197705 A1* | 7/2016 | Ryu .................... H04L 1/18 370/242 |
| 2016/0282443 A1* | 9/2016 | Steiner .............. G01S 5/0072 |

OTHER PUBLICATIONS

Singh, J. "Performing Clock Synchronization for Power Management in Multi-Hop ad Hoc Networks," International Journal on Intelligent Electronic Systems, Jul. 2009, vol. 3 (2), pp. 17-27.
International Search Report and Written Opinion—PCT/US2016/041593—ISA/EPO—Oct. 17, 2016.

* cited by examiner

PARTIAL TIMING SYNCHRONIZATION FUNCTION (TSF) SYNCHRONIZATION IN FINE TIMING MEASUREMENT (FTM) PROTOCOL

CROSS-REFERENCES TO RELATED APPLICATIONS

This patent application claims priority to and the benefit of U.S. Provisional Patent Application Ser. No. 62/203,306, filed Aug. 10, 2015, entitled "PARTIAL TSF SYNCHRONIZATION IN FTM PROTOCOL," which is assigned to the assignee hereof and is incorporated herein by reference in its entirety for all purposes.

BACKGROUND

Aspects of the present disclosure relate to synchronizing fixed, portable, or mobile stations in a wireless communication system. A station may include at least one local clock or timer on which the station bases its communication and data processing. However, it is usually difficult to precisely synchronize the local clocks among several stations in a system.

BRIEF SUMMARY

Disclosed herein are methods, systems, computer-readable media, and apparatuses for timing synchronization between wireless devices by embedding at least a part of timing synchronization function (TSF) timer value in a fine timing measurement (FTM) frame from a responding wireless device in response to a request by an initiating wireless device such that the initiating wireless device receiving the FTM frame may set its local TSF clock based on the received TSF timer value.

In some embodiments, a method of timing synchronization between a first wireless device and a second wireless device includes sending a first message by the first wireless device to the second wireless device, obtaining a first timestamp at the first wireless device by the first wireless device, and receiving, by the first wireless device, a fine timing measurement frame from the second wireless device in response to the first message. The fine timing measurement frame may include at least a part of a second timestamp from the second wireless device. The method further includes determining, by the first wireless device, that the first wireless device is not synchronized to the second wireless device based at least partially on the part of the second timestamp and the first timestamp. In some embodiments, determining that the first wireless device is not synchronized to the second wireless device may be further based on a round trip time between the first wireless device and the second wireless device. In various embodiments, the fine timing measurement frame may include one of 2, 3, 4, 5, or 8 octets of the second timestamp. The fine timing measurement frame may include a reserved bit indicating that timestamp information is present in the fine timing measurement frame. In some embodiments, the method further includes adjusting a clock on the first wireless device based at least partially on the part of the second timestamp, in response to a determination that the first wireless device is not synchronized to the second wireless device.

In some embodiments of the method of timing synchronization between the first wireless device and the second wireless device, the first message is a fine timing measurement request frame. In one embodiment, the first timestamp is based on a time of departure of the first message from the first wireless device; and the second timestamp is based on a time of arrival of the first message at the second wireless device. In another embodiment, the first timestamp is based on a time of arrival of the fine timing measurement frame at the first wireless device; and the second timestamp is based on a time of departure of the fine timing measurement frame from the second wireless device.

In some embodiments, the method of timing synchronization between the first wireless device and the second wireless device further comprises receiving, by the first wireless device, a second message, such as an acknowledgement frame, from the second wireless device in response to the first message. The first timestamp may be based on a time of arrival of the second message at the first wireless device; and the second timestamp may be based on a time of departure of the second message from the second wireless device.

Also disclosed herein is a wireless device including a memory, a clock, a wireless communication subsystem, and a processing unit communicatively coupled with the memory, the clock and the wireless communication subsystem. The wireless communication subsystem is configured to send a first message to a second wireless device, and receive a fine timing measurement frame from the second wireless device in response to the first message. The fine timing measurement frame may include at least a part of a first timestamp from the second wireless device. The processing unit is configured to obtain a second timestamp at the wireless device, and determine that the wireless device is not synchronized to the second wireless device based at least partially on the part of the first timestamp and the second timestamp. In some embodiments, the processing unit is further configured to adjust the clock based at least partially on the part of the first timestamp, in response to a determination that the wireless device is not synchronized to the second wireless device. In various embodiments, the fine timing measurement frame may include one of 2, 3, 4, 5, or 8 octets of the first timestamp. The fine timing measurement frame may include a reserved bit indicating that timestamp information is present in the fine timing measurement frame.

In some embodiments of the wireless device, the first message is a fine timing measurement request frame. In some embodiments, the first timestamp is based on a time of arrival of the first message at the second wireless device; and the second timestamp is based on a time of departure of the first message from the wireless device. In some embodiments, the first timestamp is based on a time of departure of the fine timing measurement frame from the second wireless device; and the second timestamp is based on a time of arrival of the fine timing measurement frame at the wireless device.

In some embodiments of the wireless device, the wireless communication subsystem is further configured to receive a second message, such as an acknowledgement frame, from the second wireless device in response to the first message. The first timestamp may be based on a time of departure of the second message from the second wireless device. The second timestamp may be based on a time of arrival of the second message at the wireless device.

Another aspect of the present disclosure is a non-transitory computer readable storage medium including machine-readable instructions stored thereon for synchronizing a first wireless device to a second wireless device. The instructions, when executed by one or more processors, may cause the first wireless device to: (1) send a first message to the second wireless device; (2) obtain a first timestamp at the first wireless device; (3) receive a fine timing measurement frame from the second wireless device in response to the first message, the fine timing measurement frame including at least a part of a second timestamp from the second wireless device; and (4) determine that the first wireless device is not synchronized to the second wireless device based at least partially on the part of the second timestamp and the first timestamp. In various embodiments, the fine timing measurement frame may include one of 2, 3, 4, 5, or 8 octets of the second timestamp. The fine timing measurement frame may include a reserved bit indicating that timestamp information is present in the fine timing measurement frame. In some embodiments, the instructions, when executed by one or more processors, further cause the first wireless device to adjust a clock on the first wireless device based at least partially on the part of the second timestamp, in response to a determination that the first wireless device is not synchronized to the second wireless device.

In some embodiments of the non-transitory computer readable storage medium, the first message is a fine timing measurement request frame. In some embodiments, the first timestamp is based on a time of departure of the first message from the first wireless device; and the second timestamp is based on a time of arrival of the first message at the second wireless device. In some embodiments, the first timestamp is based on a time of arrival of the fine timing measurement frame at the first wireless device; and the second timestamp is based on a time of departure of the fine timing measurement frame from the second wireless device.

In some embodiments of the non-transitory computer readable storage medium, the instructions, when executed by one or more processors, further cause the first wireless device to receive a second message, for example, an acknowledgement frame, from the second wireless device in response to the first message. The first timestamp may be based on a time of arrival of the second message at the first wireless device. The second timestamp may be based on a time of departure of the second message from the second wireless device.

Another aspect of the present disclosure is an apparatus. The apparatus includes (1) means for sending a first message from a first wireless device to a second wireless device; (2) means for capturing a first timestamp at the first wireless device; (3) means for receiving a fine timing measurement frame from the second wireless device in response to the first message, the fine timing measurement frame including at least a part of a second timestamp from the second wireless device; and (4) means for determining that the first wireless device is not synchronized to the second wireless device based at least partially on the part of the second timestamp and the first timestamp. In some embodiments, the apparatus further includes means for adjusting a clock on the first wireless device based at least partially on the part of the second timestamp in response to a determination that the first wireless device is not synchronized to the second wireless device.

In some embodiments of the apparatus, the first timestamp is based on a time of departure of the first message from the first wireless device; and the second timestamp is based on a time of arrival of the first message at the second wireless device. The first message may be a fine timing measurement request frame. In some embodiments, the first timestamp is based on a time of arrival of the fine timing measurement frame at the first wireless device; and the second timestamp is based on a time of departure of the fine timing measurement frame from the second wireless device.

In some embodiments, the apparatus further includes means for receiving a second message, for example, an acknowledgement frame, from the second wireless device in response to the first message. The first timestamp may be based on a time of arrival of the second message at the first wireless device. The second timestamp may be based on a time of departure of the second message from the second wireless device.

BRIEF DESCRIPTION OF THE DRAWINGS

Aspects of the present disclosure are illustrated by way of example. An understanding of the nature and advantages of various embodiments may be realized by reference to the following figures. In the accompanying figures, like reference numbers indicate similar elements.

DETAILED DESCRIPTION

Figure 1A:
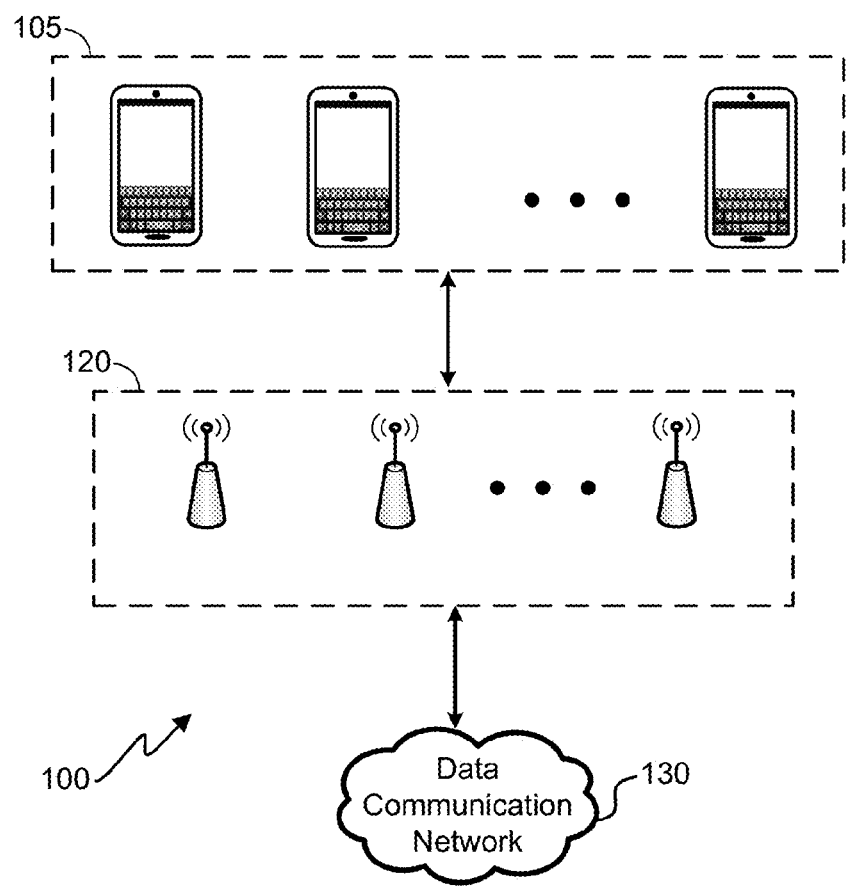
FIG. 1A is a simplified illustration of a wireless communication system, according to one embodiment.

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Techniques disclosed herein can improve the efficiency and power consumption of timing synchronization between wireless devices. The techniques involve embedding partial timing synchronization function (TSF) timer values in fine timing measurement (FTM) frames such that a wireless device receiving the FTM frames may set its local TSF timer based on the received TSF timer values.

Fixed, portable, or mobile stations (STAs) in a single infrastructure basic service set (BSS) or an independent BSS (IBSS) are usually synchronized to a common clock. In 802.11REVmc, STAs maintain local TSF timers for synchronization or other purposes. The TSF timer counts in increments of microseconds with a maximum counter value of $2^{64}$. The timing synchronization function keeps the TSF timers for all STAs in the same BSS synchronized. An access point (AP) in a BSS may be the timing master for the TSF.

In FTM protocol, there is a need for an initiating STA to have a sense of the TSF of a responding STA or AP for accurate timing measurement. An AP or responding STA may periodically transmit Beacons or announce frames including the value of the AP's TSF timer in order to synchronize the TSF timers of other STAs. An STA can synchronize its local TSF timer to the AP or responding STA by constantly receiving and parsing Beacons or announce frames. Alternatively, an initiating STA may actively transmit probe request frames and wait for a probe response that includes time information. If the initiating STA's TSF timer is different from a timestamp in the received Beacon, announce frame or probe response, the initiating STA may set its local TSF timer based on the received timestamp value. As used herein, a timestamp refers to encoded information indicating the time when a certain event occurs.

This has become a problem in, for example, multi-burst scenarios, because the time interval between two bursts may be longer than, for example, an hour, and an STA may be in power saving mode during that time and would not collect the Beacons. In addition, constantly synchronizing using the Beacons or probe responses can be time consuming and can consume a large amount of power. A more efficient synchronization method using existing protocols for wireless local area network (WLAN) communication, such as IEEE 802.11REVmc, is desired.

I. Wireless Communication Systems

Wireless communication systems may comprise wireless devices and APs, which allow the wireless devices to connect to a wired or wireless network using one or more wireless standards. An AP is generally referred to as an entity that includes one STA and provides access to distribution services via wireless medium for associated STAs. An STA is a logical entity that is a singly addressable instance of a medium access control (MAC) and a physical layer (PHY) interface to the wireless medium. Some wireless communication systems may allow wireless devices to be configured as STAs that can communicate between one another or through the APs. Standards such as IEEE 802.11ac, 802.11ad, 802.11v, 802.11REVmc, etc. are commonly used for such communications. These standards can include error specifications to ensure quality of communication.

IEEE 802.11 is a set of media access control and physical layer specification for implementing wireless local area network (WLAN) communication, called Wi-Fi, in the unlicensed (2.4, 3.6, 5, and 60 GHz) frequency bands. Wi-Fi plays an important role in the growing application of Indoor Location. The key applicable Wi-Fi technology in Indoor Location is ranging using time-of-flight (TOF) ranging measurements defined in IEEE 802.11, because distances between devices can be used to determine device location.

In IEEE 802.11REVmc, fine timing measurement protocol is proposed for ranging. Based on FTM, an initiating station exchanges FTM frames with a responding station to measure the time-of-flight or the round trip time (RTT). The initiating station then computes its range to the responding station after receiving fine timing measurements (i.e., timestamps corresponding to the departure time of the FTM frame and the arrival time of its corresponding acknowledge ACK frame) from the responding station. In FTM positioning, the initiating station exchanges FTM frames with multiple responding APs for TOF measurements in order to determine its absolute location. For example, in 3D positioning, the initiating station exchanges FTM frames with at least three APs in order to determine its absolute location.

FIG. 1A is a simplified illustration of a wireless communication system 100, according to one embodiment. The wireless communication system 100 can include one or more STA(s) 105, AP(s) 120, and a data communication network 130. It should be noted that FIG. 1A provides only a generalized illustration of various components, any or all of which may be utilized as appropriate. Furthermore, components may be rearranged, combined, separated, substituted, and/or omitted, depending on desired functionality. For example, although only a few STAs 105 and APs are illustrated in wireless communication system 100 illustrated in FIG. 1A, embodiments may include a smaller or larger number of either or both STAs and/or APs. For instance, embodiments may include dozens, hundreds, thousands, or more of either or both STAs and/or APs. In addition, STA(s) 105 and/or AP(s) 120 may be connected with one or more additional networks, such as cellular carrier networks, satellite positioning networks, and the like which can have a variety of components (e.g., servers, satellites, base stations, etc.) that are not illustrated in FIG. 1A. A person of ordinary skill in the art will recognize many modifications to the embodiment illustrated.

A wireless device or STA, as described herein, may comprise a system, a subscriber unit, a subscriber station, a fixed station, a portable station, a mobile station, a remote mobile station, a remote terminal, a mobile device, a user terminal, a terminal, a wireless communication device, a user agent, a user device, a user equipment (UE), or an access point. For example, an STA can be a cellular telephone, a cordless telephone, a session initiation protocol (SIP) phone, a wireless local loop (WLL) station, a personal digital assistant (PDA), a handheld device having wireless connection capability, a computing device, or other processing device connected to a wireless modem.

It is further noted that, although techniques described herein refer to synchronizing clocks between two STAs, embodiments are not so limited. Techniques described herein may apply more generally to two wireless transceivers, including APs and/or other wireless devices.

As mentioned above, STA(s) 105 can communicate with AP(s) 120, which can enable the STA(s) 105 to communicate through data communication network 130. Communication to and from STA(s) 105 may thus also be implemented, in some embodiments, using various wireless communication standards and/or protocols, which may be determined by data communication network 130. Some embodiments can include, for example, one or more of the IEEE 802.11 family of standards as discussed above. Data communication network 130 may comprise one or more of a variety of networks, including local networks such as a local area network (LAN) or a personal area network (PAN), a wide area network (WAN) such as the Internet, and/or any of a variety of public and/or private communication networks. Moreover, networking technologies can include switching and/or packetized networks utilizing optical, radio frequency (RF), wired, satellite, and/or other technologies.

Wireless communication system 100 may provide positioning capabilities to calculate or estimate the location of one or more STAs 105. Such capabilities can include a satellite positioning system (SPS), such as the Global Positioning System (GPS), and/or triangulation and/or trilateration provided by stationary components, such as the AP(s) 120. Additionally or alternatively, when there is a plurality of STAs 105 in a wireless communication system 100, STAs 105 may be configured to provide positioning capabilities based on their determined distance from one another. In positioning or location based applications using an IEEE 802.11 standard, the determination of round trip time for pre-specified messages or dialogs between two STAs, for example, can be used to provide an indication of distance between the two STAs.

An STA 105 can include at least one local clock, on which the STA 105 bases its communication and data processing. However, it is usually not possible to precisely synchronize the local clocks among the several STAs, and therefore, each local clock may have its own timing error or clock drift relative to clocks of other STAs.

Figure 1B:
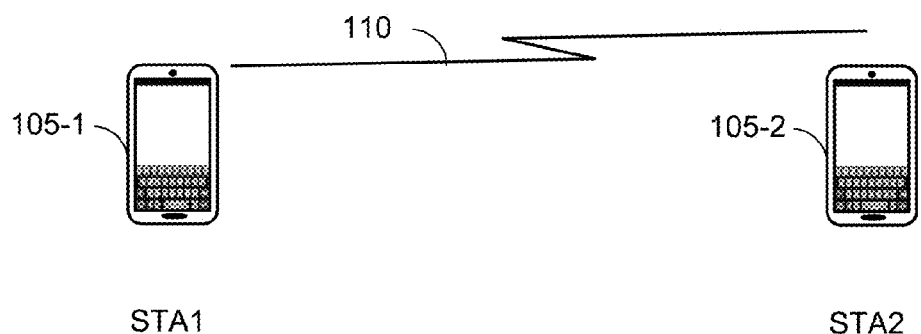
FIG. 1B illustrates an example setup in which stations may be synchronized.

FIG. 1B illustrates an example setup in which synchronization between STAs may be achieved, according to one embodiment. Here, two STAs (STA1 105-1 and STA2 105-2) can communicate with each other using wireless communication signals 110. STAs 105 may be part of a larger system, such as wireless communication system 100 illustrated in FIG. 1A. To obtain the RTT and estimated distance from one STA to the other, STAs 105 may engage in an exchange of fine timing measurement frame and acknowledgement, as described below.

Figure 1C:
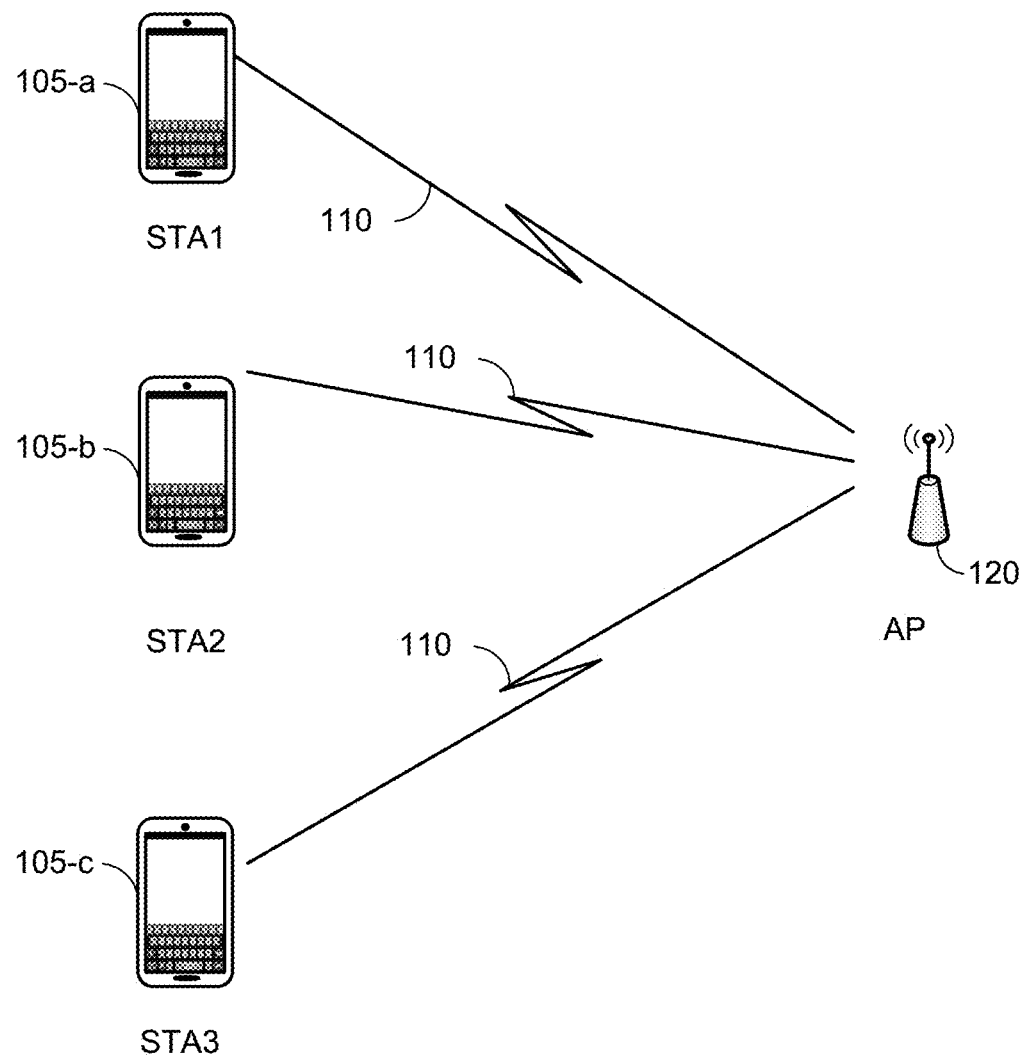
FIG. 1C illustrates another example setup in which stations may be synchronized.

FIG. 1C is another example setup in which STAs may be synchronized. Here, an AP can communicate with three STAs—STA1 105-a, STA2 105-b, and STA3 105-c—using wireless communication signals 110. The wireless communication signals 110 may include uplink (UL) and/or downlink (DL) frames. STAs may additionally communicate directly with each other via similar means. Additional STAs and/or APs (not shown) may be part of the same wireless system (e.g., WLAN). Some wireless systems may have more or fewer STAs. It will be understood that the techniques described herein may be utilized in systems having different configurations and/or components than those shown. Moreover, wireless systems may include other types of wireless devices. A person of ordinary skill in the art will recognize these and other variations to the embodiments shown in FIGS. 1A-1C. The STAs and/or APs can correspond with wireless devices and/or may incorporate components of a computer, such as computing systems, described below in the present disclosure.

In general, embodiments described herein may pertain to wireless communications for devices utilizing a wireless communication system 100, such as a WLAN, according to various IEEE 802.11 communication standards. Some embodiments may utilize standards other than the IEEE 802.11 family of standards. In some embodiments, rather than relying on satellite signals or assistance data from terrestrial base stations transmitting satellite geo-positioning data, STAs may acquire their geographic locations using wireless APs. The APs may transmit and receive wireless signals following various IEEE 802.11 standards, such as 802.11g, 802.11n, 802.11ac, 802.11ad, 802.11v, etc. In some embodiments, STAs may comply with 802.11ac, 802.11v, and/or 802.11REVmc standards while transmitting or receiving signals from multiple antennas. Some embodiments may sample timing signals in 0.1 nanosecond (ns) or 1 picosecond (ps) increments, while some other embodiments may sample signals in time increments of less than 10 ns, such as, for example, 1.5 ns, 2 ns, 0.1 ns, etc., while still complying with the standards.

Embodiments may implement time of departure (TOD) and time of arrival (TOA) measurements from IEEE 802.11 standards based on definitions that account for transmitted signals from multiple antennas. In some embodiments, the time difference between the TOA and TOD, rather than the TOA and TOD, may be transmitted. In some embodiments, both receiving and sending STAs may transmit information sufficient to compute TOD and TOA measurements. In some embodiments, some of the information may be codified in revised 802.11 standards. The APs may transmit and receive timing measurements, such as TOA and TOD measurements, to and from the STAs. When an STA obtains timing measurements from three or more APs along with geographical positioning information of the APs, the STA may be able to determine its location by performing techniques similar to GPS positioning, e.g. trilateration and the like, using the multiple timing measurements. In some cases (e.g., particularly when at least one of the STAs is stationary), the STAs may transmit and receive timing measurements between one another in order to obtain the RTT and the distance between one another.

II. FTM Protocol

Figure 2:
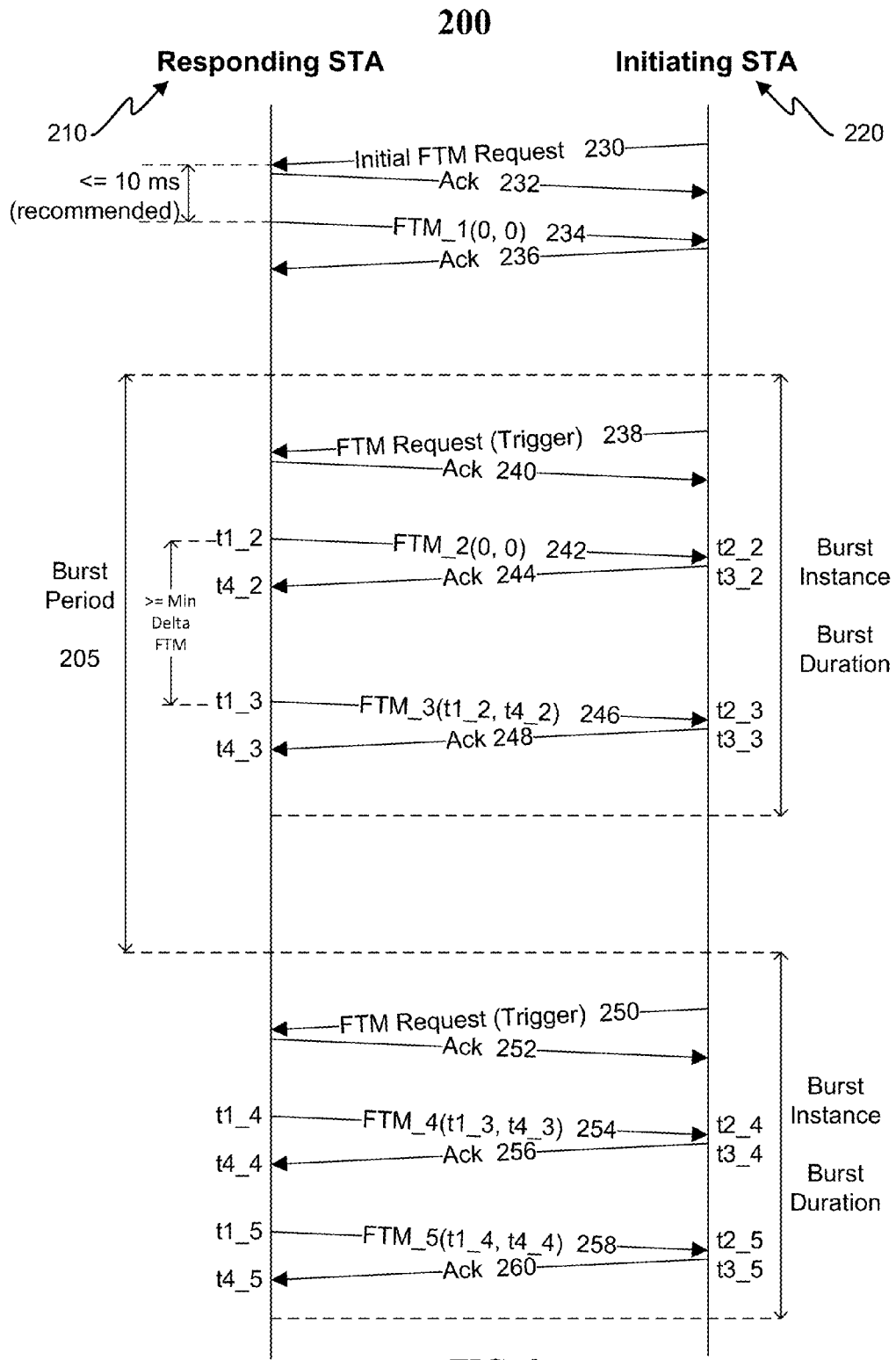
FIG. 2 illustrates a fine timing measurement (FTM) session in IEEE 802.11REVmc.

FIG. 2 illustrates an IEEE 802.11REVmc FTM session 200 with multiple bursts. In order to initiate a fine timing measurement procedure, an STA 220 that supports fine timing measurement protocol as an initiator (referred to as an initiating STA) transmits an initial FTM Request frame 230. An STA 210 that supports the fine timing measurement protocol as a responder (referred to as a responding STA) does not transmit FTM frames to a peer STA unless the peer STA supports the fine timing measurement protocol as an initiator and responding STA 210 has received an initial FTM request frame from the peer STA. FTM request frame 230 may include a trigger field and a set of scheduling parameters in a FTM parameters field that describe the initiating STA's availability for measurement exchange. Responding STA 210 may send an ACK frame 232 to initiating STA 220 acknowledging the successful reception of initial FTM request 230.

A first FTM frame in FTM session 200 is an initial FTM frame FTM_1 234. Responding STA 210 may generally transmit initial FTM frame FTM_1 234 within 10 ms in response to initial FTM request frame 230. Initial FTM frame FTM_1 234 includes a FTM parameters field. A value of a status indication field in initial FTM frame FTM_1 234 indicates whether the initial FTM request was successful, incapable or failed. Initiating STA 220 acknowledges the receiving of initial FTM frame FTM_1 234 by sending an ACK frame 236.

FTM frames are generally sent during time windows called burst instances. The timing of the burst instances may be defined by the following parameters in the FTM parameter field of an initial FTM request frame or initial FTM frame: (1) partial TSF timer value for the beginning of the first burst instance; (2) burst duration—the duration of each burst instance starting at the boundary of a burst period; and (3) burst period—the interval from the beginning of one burst instance to the beginning of the following burst instance.

In FTM session 200 shown in FIG. 2, an "ASAP" field in FTM request frames is set to 0. The ASAP field indicates whether an initiating STA's requests to start the first burst instance of the FTM session as soon as possible. When the ASAP field is set to 0 by an initiating STA, the initiating STA requests the start of the first burst instance specified by the partial TSF timer field in the FTM request frame. When the ASAP field in the FTM request frame is set to 1 by an initiating STA, the partial TSF timer field in the FTM request frame indicates the requested start of the first burst instance if the ASAP field is set to 0 in the initial FTM frame.

When the ASAP field is set to 0, an FTM trigger frame may be used to trigger each burst instance. An FTM trigger frame is an FTM request frame that has the trigger field set to 1 and does not include a measurement request field or a FTM parameters field. The first burst instance starts at the value indicated by the Partial TSF Timer field in the initial FTM frame. When ASAP is set to 1 by the responding STA, the Partial TSF Timer field value may be set to a value less than 10 ms from the reception of the most recent initial FTM request frame.

The ASAP field can also be used by the responding STA to signal whether the initiating STA's request to start the first burst instance of the FTM session as soon as possible has been honored or not. When the ASAP field is set to 0 by the responding STA, the Partial TSF Timer field in the initial Fine Timing Measurement frame indicates the start time of the first burst instance and the earliest time the FTM trigger should be sent by the initiating STA. When the ASAP field is set to 1 by the responding STA, the Partial TSF Timer field in the initial Fine Timing Measurement frame indicates the start time of the first burst instance and the earliest time the initial Fine Timing Measurement frame will be sent. The responding STA may set the ASAP field to 1 to indicate the STA's intent to send a Fine Timing Measurement frame as soon as possible.

As shown in FIG. 2, initiating STA 220 transmits an FTM trigger frame 238 at the beginning of a burst as soon as it is available on channel. This indicates to responding STA 210 availability of initiating STA 220 for the remainder of the burst instance. Following FTM trigger frame 238, responding STA 210 transmits an ACK frame 240, and transmits non-initial FTM frames, such as FTM_2 242 and FTM_3 246, before the burst duration elapses. Initiating STA 220 sends an ACK frame, such as ACK frame 244 or 248, each time an FTM frame is successfully received. Within a burst instance, consecutive FTM frames are spaced at least a Min Delta FTM apart. After a burst period, a next burst instance may start, which includes similar operations as in the first burst instance as indicated by operations 250, 252, 254, 256, 258, and 260.

Within a burst instance, initiating STA 220 may perform fine timing measurement on each FTM frame addressed to it. For example, responding STA 210 transmits FTM frame FTM_2 242, and captures a first time t1_2 when FTM frame FTM_2 242 is transmitted. Initiating STA 220 captures a second time t2_2 when FTM frame FTM_2 242 arrives at initiating STA 220. Additionally, initiating STA 220 captures a third time t3_2 hen it transmits ACK frame 244. Responding STA 210 captures a fourth time t4_2 when ACK frame 244 arrives at responding STA 210. Responding STA 210 then sends the captured first time t1_2 and fourth time t4_2 to initiating STA 220 in the next FTM frame FTM_3 246. Initiating STA 220 can then calculate the round trip time (RTT) as RTT=(t4_2−t1_2)−(t3_2−t2_2).

Figure 3A:
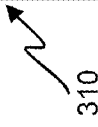
FIG. 3A illustrates an initial FTM request frame in IEEE 802.11REVmc.

FIG. 3A illustrates an example of an FTM request frame 310 that corresponds to, for example, initial FTM request 230, FTM request 238, or FTM request 250 of FIG. 2. As shown in FIG. 3A, FTM request frame 310 includes a 1-octet Category field, a 1-octet Public Action field, a 1-octet Trigger field, an optional location configuration information (LCI, which may include latitude, longitude and altitude information) measurement request field, an optional Location Civic Measurement Request field, and an optional FTM Parameters field. The Category field is set to the value for Public. The Public Action field is set to indicate that this is a FTM request frame. A "1" in the Trigger field indicates that the initiating STA requests that the responding STA start or continue sending FTM measurement frames. A "0" in the Trigger field indicates that the initiating STA requests that the responding STA stop sending FTM measurement frames. The LCI Measurement Request field, if present, includes a Measurement Request element with Measurement Type equal to LCI Request, which indicates a request for a Measurement Report element with Measurement Type equal to LCI. The Location Civic Measurement Request field, if present, includes a Measurement Request element with Measurement Type equal to Location Civic Request, which indicates a request for a Measurement Report with Measurement Type equal to Location Civic report. The FTM Parameters field is present in the initial FTM Request frame, such as initial FTM request 230 of FIG. 2, but is not present in subsequent FTM Request (trigger) frames, such as FTM Request frame 238 or 250 in FIG. 2. If present, the FTM parameter field includes FTM parameters.

Figure 3B:
FIG. 3B illustrates an initial FTM frame in IEEE 802.11REVmc.

FIG. 3B is an example of an FTM frame 320 that corresponds to, for example, FTM_1 234, FTM_2 242, FTM_3 246, FTM_4 254, or FTM_5_258 of FIG. 2. As shown in FIG. 3B, FTM frame 320 includes a 1-octet Category field, a 1-octet Public Action field, a 1-octet Dialog Token field, a 1-octet Follow Up Dialog Token field, a 6-octet TOD field, a 6-octet TOA field, a 2-octet TOD Error field, a 2-octet TOA Error field, an optional LCI Report field, an optional Location Civic Report field, and an optional FTM Parameters field. The Category field is set to the value for Public. The Public Action field is set to indicate that this is a FTM frame. The Dialog Token field is a nonzero value chosen by the responding STA to identify the FTM frame as the first of a pair, such as FTM_2 242 in FIG. 2, with a second or a follow-up FTM frame, such as FTM_3 246, to be sent later. The Dialog Token field can be set to "0" to indicate that the FTM frame will not be followed by a subsequent follow-up FTM frame. The Follow Up Dialog Token field is the nonzero value of the Dialog Token field of the last transmitted FTM frame, indicating that it is the follow up FTM frame and that the TOD, TOA, TOD Error and TOA Error fields include the values of the timestamps captured for the first FTM frame of the pair. For example, FTM_3 246 may include timestamps captured for FTM frame FTM_2 242. The Follow Up Dialog Token field is set to "0" to indicate that the FTM frame is not a follow-up to a last transmitted FTM. The TOD, TOA, TOD Error, and TOA Error fields may be expressed in units of 0.1 ns. The TOD field includes a timestamp that represents the time, with respect to a time base, at which the start of the preamble of the last transmitted FTM frame appeared at the transmit antenna connector. The TOA field includes a timestamp that represents the time, with respect to a time base, at which the start of the preamble of the ACK frame to the last transmitted FTM frame arrived at the receive antenna connector. The TOD Error field includes an upper bound for the error in the value specified in the TOD field. The TOA Error field includes an upper bound for the error in the value specified in the TOA field. The LCI Report field is optionally present. If present, it includes a Measurement Report element with Measurement Type equal to LCI report. The Location Civic Report field is optionally present. If present, it includes a Measurement Report element with Measurement Type equal to Location Civic report. The FTM Parameters field is present in the initial FTM frame, such as FTM_1 234 in FIG. 2, but is not present in subsequent FTM frames, such as FTM_2 242 or FTM_3 246 in FIG. 2. If present, the FTM Parameters filed includes FTM Parameters.

III. Modified FTM Sessions and Frames

Because FTM frames have been used by the initiating STA and responding STA to exchange time information for fine timing measurement already, the FTM protocol may be extended or modified to transmit TSF timer values within the FTM frames along with the time information for fine timing measurement.

Figure 4:
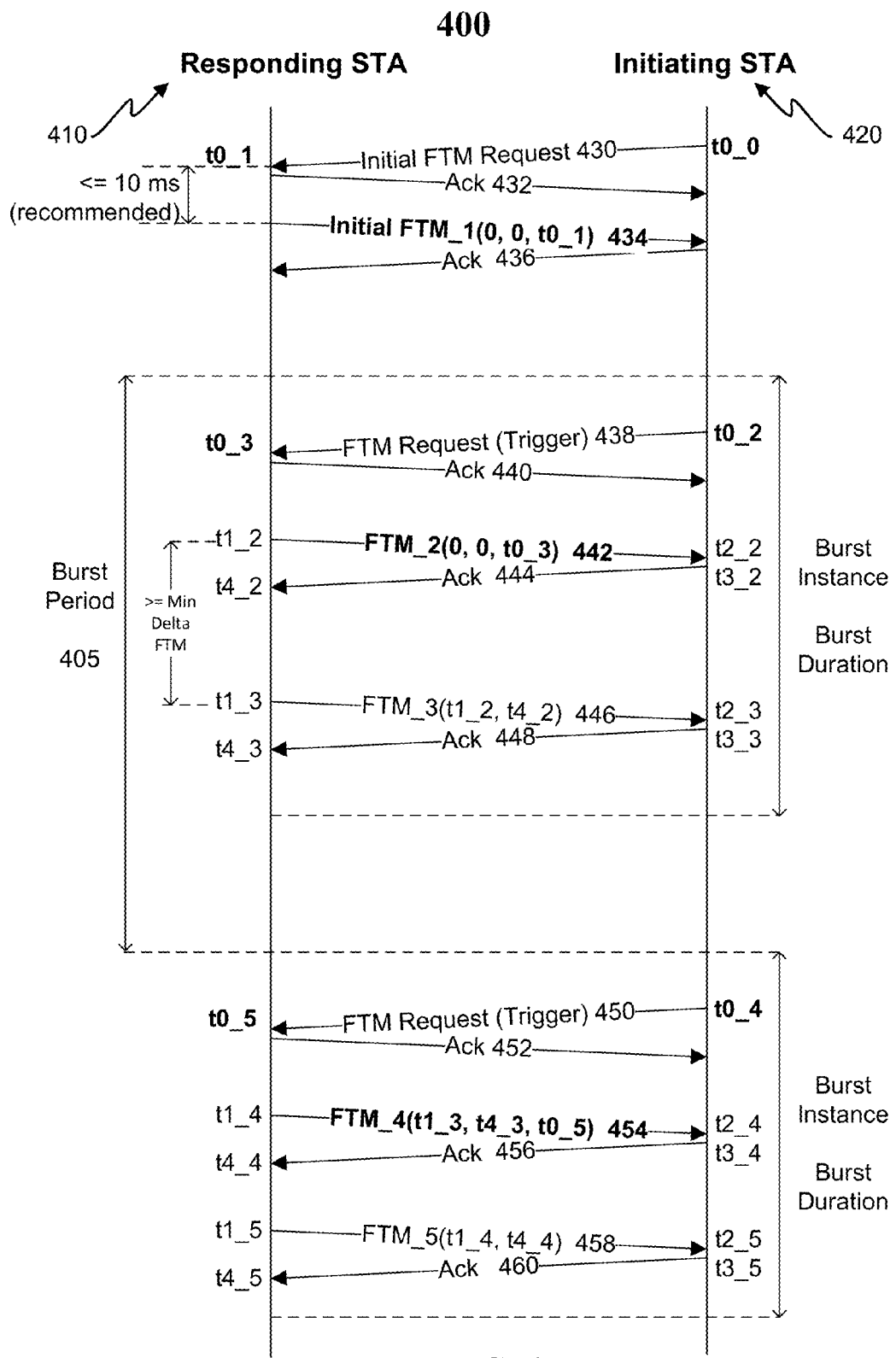
FIG. 4 illustrates an FTM session with partial timing synchronization function timer embedded in an FTM frame according to some embodiments of the present disclosure.

FIG. 4 is a diagram 400 illustrating an FTM session with partial timing synchronization function timer values embedded in FTM frames according to some embodiments of the present disclosure. FIG. 4 is similar to FIG. 2, but with additional timestamps being captured and transmitted. As shown in FIG. 4, timestamps of the last successfully transmitted FTM request frame (for which an ACK has been properly received by the initiating STA), for example, initial FTM request 430 and FTM trigger requests 438 and 450 in FIG. 4, can be captured at both initiating STA 420 at the time of departure (TOD) of the FTM request and at responding STA 410 at the time of arrival (TOA) of the FTM request. Responding STA 410 can then send the captured timestamp at TOA of the last successfully transmitted FTM request in an FTM frame. For example, as shown in FIG. 4, responding STA 410 may capture its timer value t0_1 at the TOA of initial FTM request 430, and send the timer value t0_1 in FTM_1 434 to initiating STA 420, which may then use time value t0_1 and the timestamp t0_0 it captured at the TOD of the initial FTM request 430 for synchronization with responding STA 410. Similarly, for each burst instance, responding STA 410 may capture its timer value t0_3 or t0_5 at the TOA of a first non-initial FTM request (FTM trigger request), such as FTM request 438 or 450, and send timer value t0_3 in FTM_2 442 or t0_5 in FTM_4 454 to initiating STA 420, which may then use time value t0_3 or t0_5 and the timestamp it captured at the TOD of FTM request 438 (t0_2) or 450 (t0_4) for synchronization with responding STA 410.

Some embodiments may vary from the FTM session illustrated in FIG. 4, depending on the request of the initiating STA. For example, the FTM session may be in multiple-burst or single-burst mode, and the initiating STA may request responding STA 710 to start the burst instances "as soon as possible." In various embodiments, the order of determining timestamps and sending messages may be altered. For example, in some embodiments, the timestamps captured at the responding STA, such as t0_3 or t0_5, may be sent to the initiating STA in FTM_3 446 or FTM_5 458, where possible. In some embodiments, a timestamp captured at the responding STA may be sent in two or more parts. For example, a part of timestamp t0_3 may be sent in FTM_2 442 and the other part of timestamp t0_3 may be sent in FTM_3 446. A person of ordinary skill in the art will recognize many variations on the embodiment illustrated.

Figure 5A:
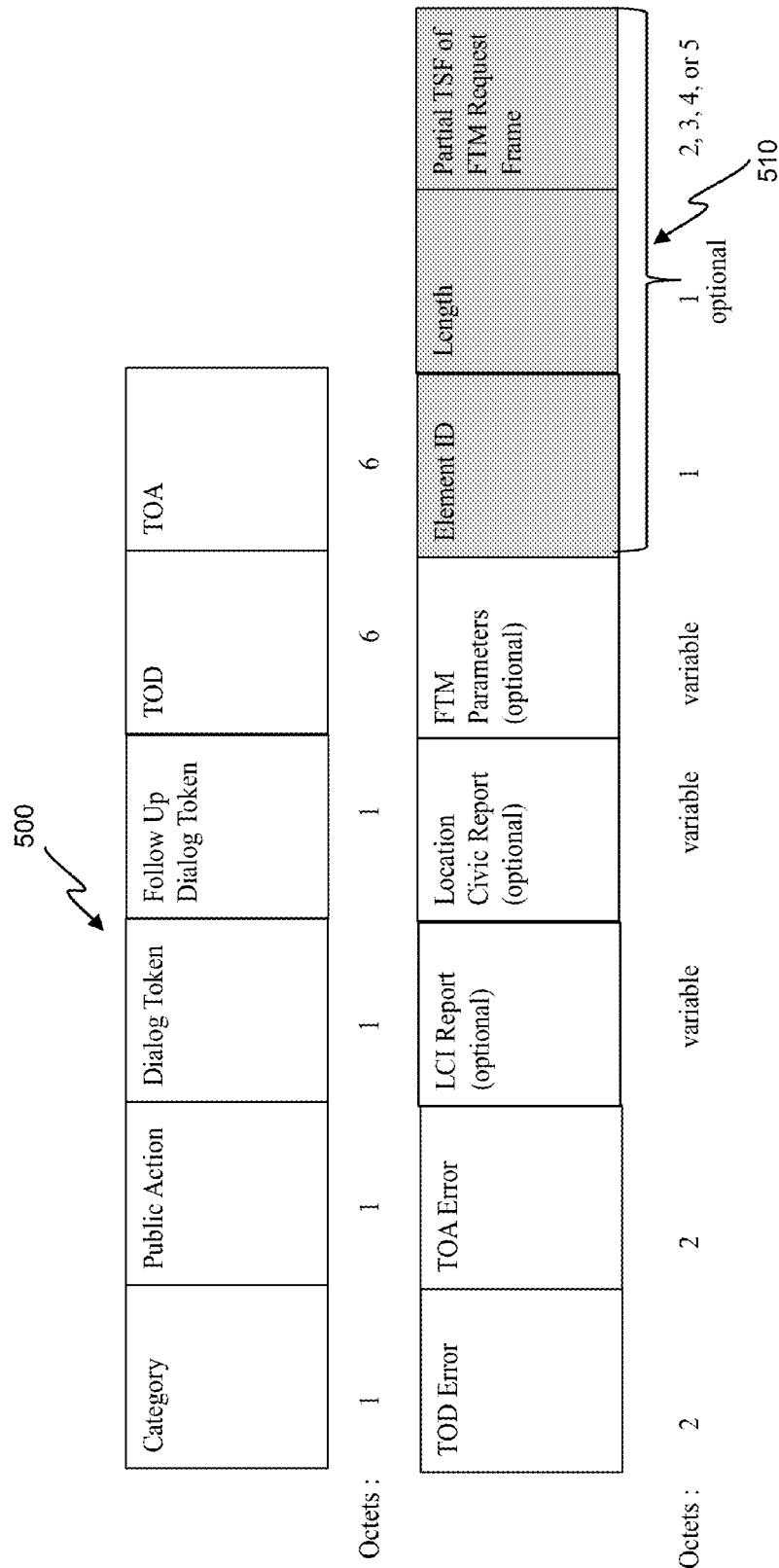
FIG. 5A illustrates an example modified initial FTM frame.

FIG. 5A illustrates an example modified initial FTM frame 500, such as FTM_1 434 in FIG. 4, in response to an initial FTM request, such as initial FTM request 430. FTM frame 500 includes new fields 510 compared with FTM frame 320 shown in FIG. 3B. New fields 510 may include a 1-octet Element ID, a 1-octet Length, and a 2, 3, 4, or 5-octet partial TSF of FTM Request Frame. The Element ID identifies the type of an element by a pre-defined number. The Length field specifies the number of octets following the Length field. For example, the length field may have a value of 2, 3, 4, or 5 for FTM frame 500. The partial TSF of FTM request frame may include at least a part of a timestamp captured at the TOA of the FTM request frame by the responding STA, and may include, for example, 2 octets, 3 octets, 4 octets, or 5 octets. In various embodiments, new field 510 may be added at different locations in FTM frame 500, such as before the LCI Report field.

When the partial TSF of FTM request frame field is 2-octet long, the partial TSF may represent bits [25:10] of a 64-bit full TSF timer value (&0x0000000003FFFC00), and therefore has a unit of $2^{10}$ or 1024 µs and a wrap-around time of about 67 seconds. This format is consistent with Partial TSF field used in, for example, FTM parameters field of an FTM frame.

When the partial TSF of FTM request frame field is 3-octet long, the partial TSF may represent bits [23:0] of the 64-bit full TSF timer value (&0x0000000000FFFFFF), and therefore has a unit of 1 µs and a wrap-around time of about 17 seconds. This may be helpful when the burst duration is 250 µs, which requires a better timing accuracy. Alternatively, the partial TSF may represent bits [31:8] of the full TSF timer value (&0x00000000FFFFFF00), and therefore has a unit of $2^8$ or 256 µs and a wrap-around time of about 1.2 hours.

When the partial TSF of FTM request frame field is 4-octet long, the partial TSF may represent bits [31:0] of the full TSF timer value (&0x00000000FFFFFFFF), and therefore has a unit of 1 µs and a wrap-around time of about 1.2 hours. This may be helpful when the burst duration is 250 µs, which requires a better timing accuracy.

When the partial TSF of FTM request frame field is 5-octet long, the partial TSF may represent bits [39:0] of the full TSF timer value (&0x000000FFFFFFFFFF), and therefore has a unit of 1 µs and a wrap-around time of about 305 hours.

In some embodiments, a full 64-bit TSF timer value may be included in initial FTM frame 500 in response to an initial FTM request, rather than only sending a partial TSF timer value.

Figure 5B:
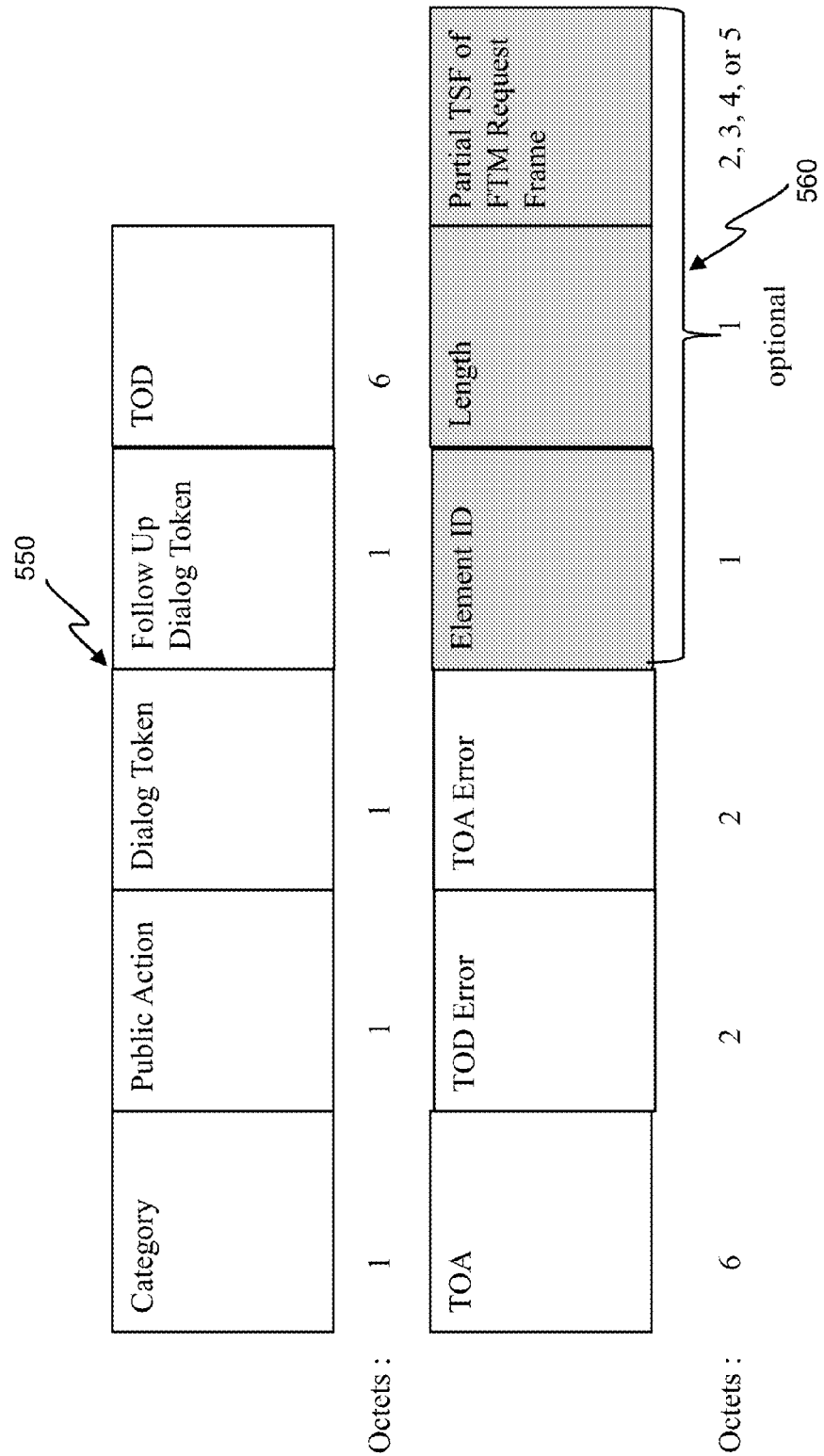
FIG. 5B illustrates an example modified first non-initial FTM frame.

FIG. 5B illustrates an example modified non-initial FTM frame 550, such as FTM_2 and FTM_4 of FIG. 4, in response to a first non-initial FTM request, such as FTM request 438 or 450 in FIG. 4, at the beginning of a burst instance. Non-initial FTM frame 550 includes new fields 560 compared with a first non-initial FTM frame in a way similar to initial FTM frame 500. As in initial FTM frame 500, new fields 560 in non-initial FTM frame 550 may include a 1-octet Element ID, a 1-octet Length, and a 2, 3, 4, or 5-octet partial TSF of FTM Request Frame. The Element ID identifies the type of an element by a pre-defined number. The Length field specifies the number of octets following the Length field. For example, the length field may have a value of 2, 3, 4, or 5 for non-initial FTM frame 550. The partial TSF of FTM request frame may include at least a part of a timestamp captured at the non-initial FTM request frame by the responding STA, and may include 2 octets, 3 octets, 4 octets, or 5 octets, where the partial TSF value may include the same bits as described above with respect to initial FTM frame 500 in FIG. 5A.

In some embodiments, a full 64-bit TSF timer value may be included in initial FTM frame 500 in response to the initial FTM request, while a 2, 3, 4, or 5-octet partial TSF value may be included in non-initial FTM frame 550. In some embodiments, the partial TSF value may be larger than 5 octets or less than 2 octets.

Figure 5C:
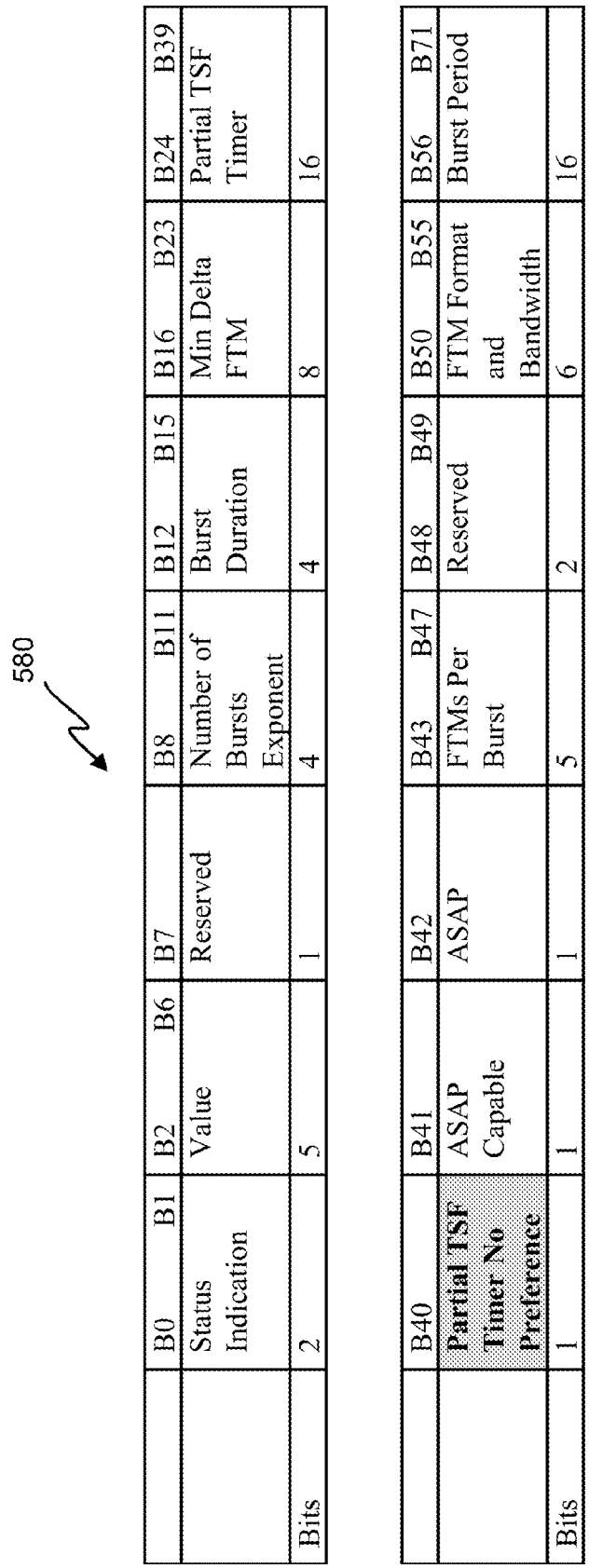
FIG. 5C illustrates an example modified FTM Parameters field.

FIG. 5C illustrates an example modified FTM Parameters field 580. As shown in FIG. 5C, reserved bit B40 may be designated as a Partial TSF Timer No Preference bit. In this way, if the initiating STA has no knowledge of the Partial TSF value to be used in the initial FTM Request frame, it is possible for the initiating STA to indicate no preference in the Partial TSF Timer in the FTM request frame. When set to "1," the Partial TSF Timer No Preference bit in FTM Parameters field 580 indicates that the initiating STA has no preference as to when the first burst instance starts, and the corresponding Partial TSF Timer field (B24-B39) is reserved and should be ignored by the responding STA. The Partial TSF Timer No Preference bit is reserved, or set to "0," when FTM Parameters field 580 is included in a Fine Timing Measurement frame.

In some embodiments, a reserved bit in TOA error field may be set to indicate that a partial TSF of FTM Request Frame field is present such that the element ID and length field in FTM frame 500 or 550 may be omitted to reduce the number of bits transmitted.

Figure 6A:
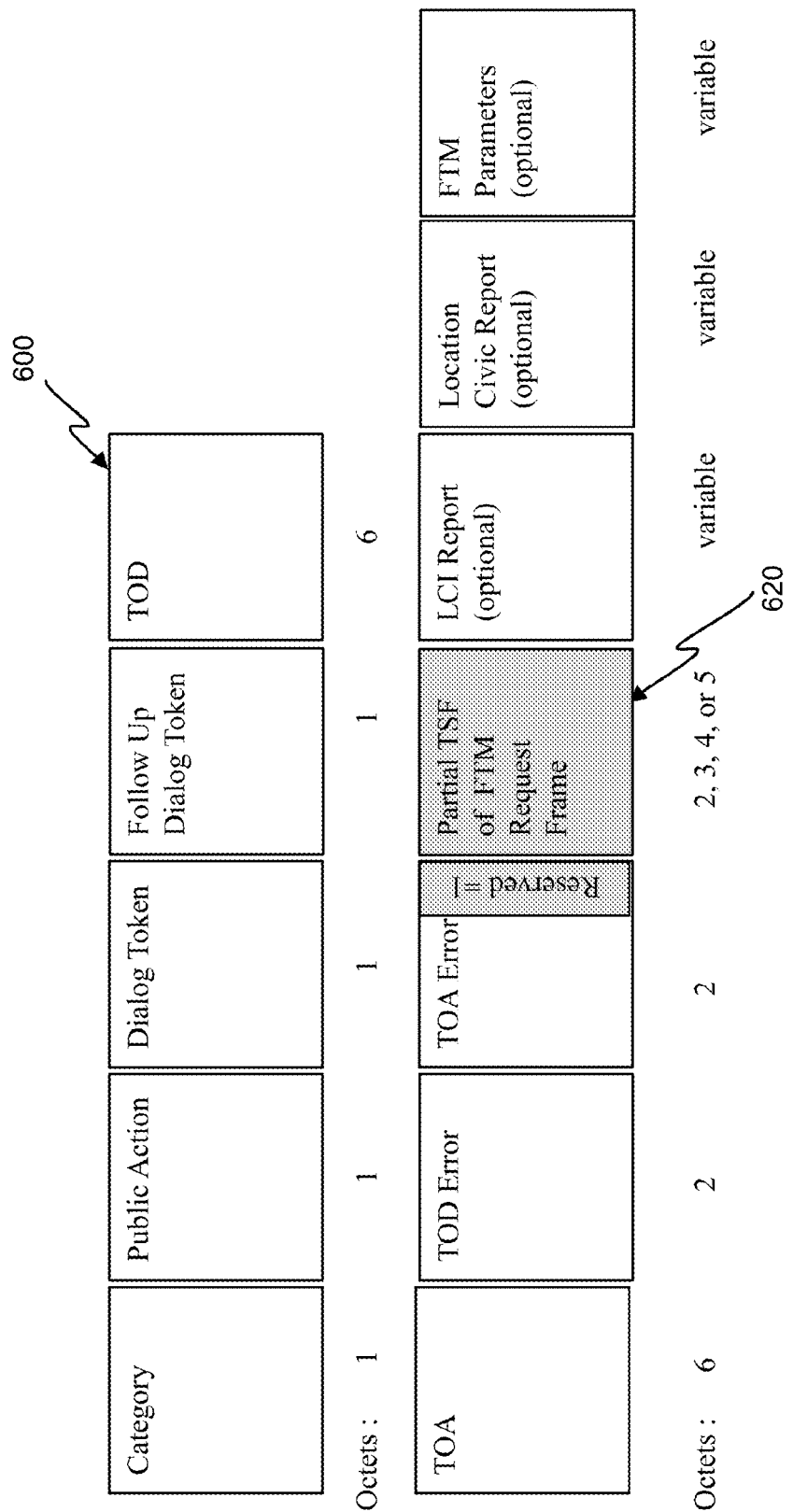
FIG. 6A illustrates an example modified initial FTM frame using a reserved bit.

FIG. 6A illustrates an example modified initial FTM frame 600, such as FTM_1 of FIG. 4, using a reserved bit, where a reserved bit in TOA error field is set to 1 to indicate that a partial TSF of FTM Request Frame field is present, and a partial TSF of FTM request frame field 620 is inserted after the TOA error field. As in initial FTM frame 500 of FIG. 5A, partial TSF of FTM request frame field 620 may be 2, 3, 4, or 5-octet long and may represent the same bits as described above with respect to initial FTM frame 500 in FIG. 5A. In some embodiments, a full 64-bit TSF value may be included in FTM frame 600 in response to the initial FTM request, rather than only sending a partial TSF.

Figure 6B:
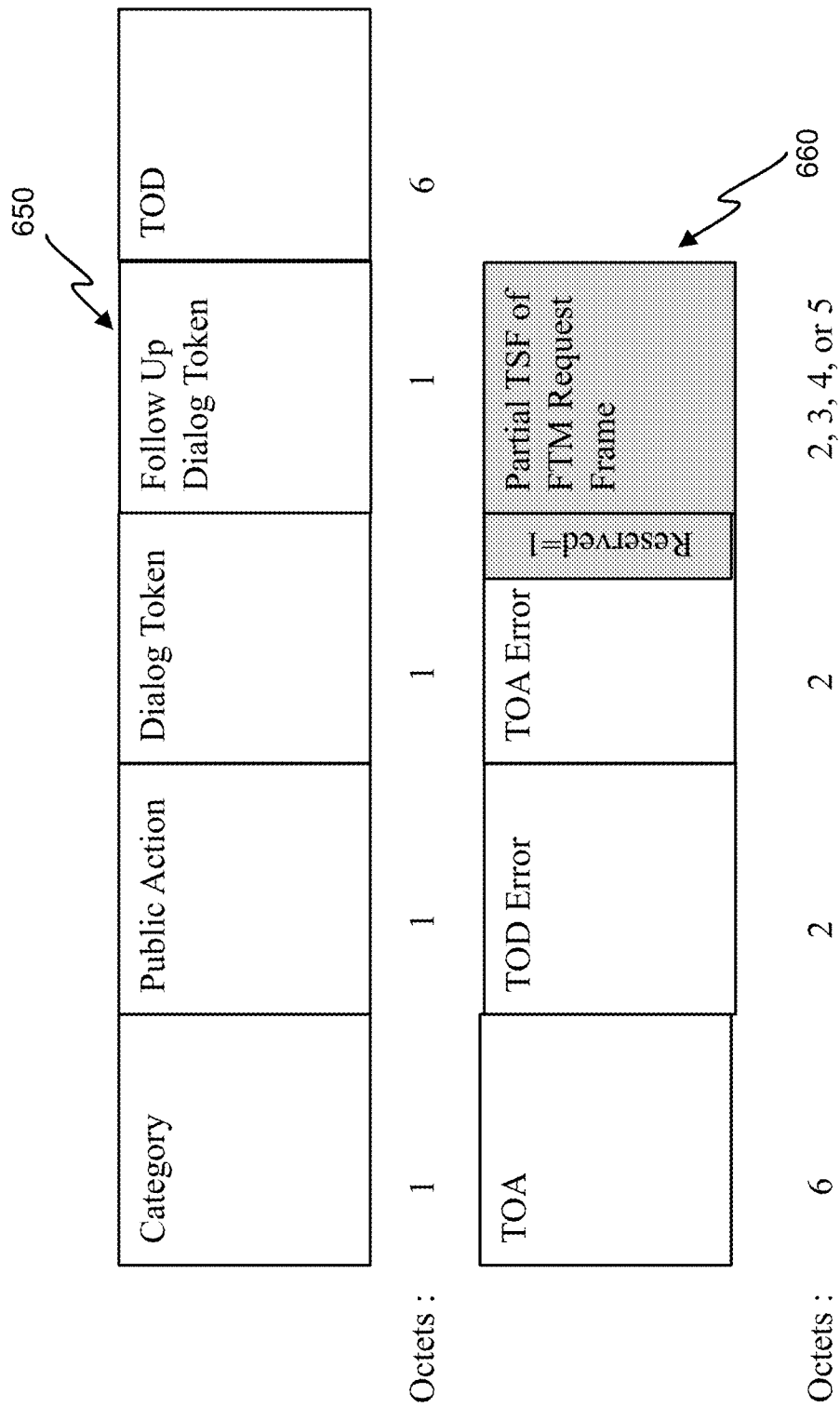
FIG. 6B illustrates an example modified first non-initial FTM frame using a reserved bit.

FIG. 6B illustrates an example modified first non-initial FTM frame 650, such as FTM_2 and FTM_4 of FIG. 4, in response to a first non-initial FTM request at the beginning of a burst instance, where a reserved bit is set to 1 to indicate that a partial TSF of FTM Request Frame field is present. As shown in FIG. 6B, a partial TSF of FTM request frame field 660 is inserted after the TOA error field. As in non-initial FTM frame 550 of FIG. 5B, partial TSF of FTM request frame field 660 may be 2, 3, 4, or 5-octet long and may represent the same bits as described above with respect to non-initial FTM frame 550 in FIG. 5B.

The above examples illustrate certain embodiments of the present disclosure in multiple-burst situations and with ASAP set to 0. However, the method described above is applicable to both multiple-burst and single-burst scenarios and regardless of whether ASAP=0 or ASAP=1. The partial TSF of FTM request frame field as described above may be inserted into the first FTM of any burst instance in response to a non-initial FTM request and/or an initial FTM frame in response to an initial FTM request.

Figure 7A:
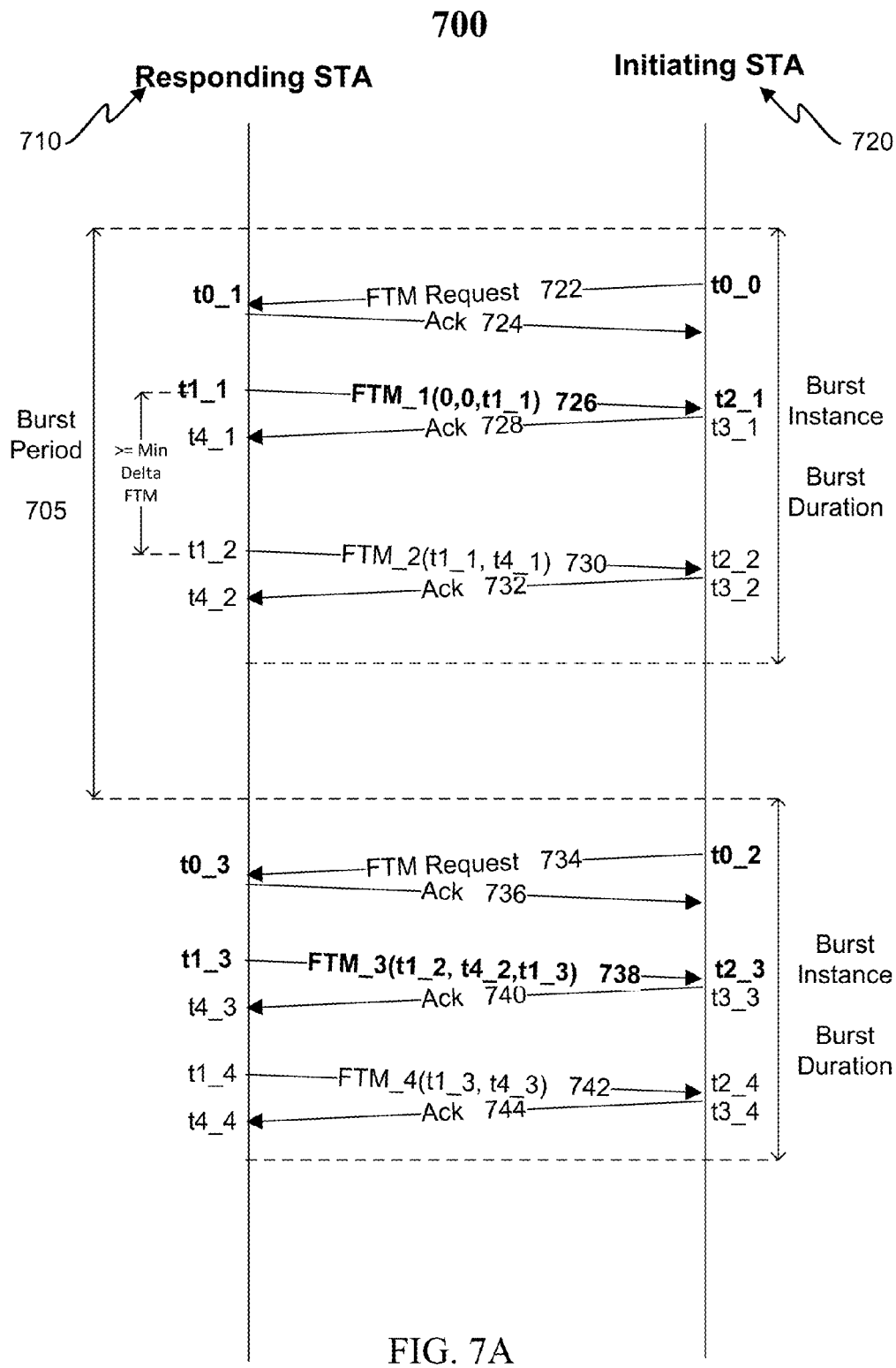
FIG. 7A illustrates an FTM session according to one embodiment of the present disclosure.

FIG. 7A illustrates an FTM session 700 according to one embodiment of the present disclosure, where initiating STA 720 requests responding STA 710 to start the burst instances "as soon as possible" by setting the ASAP field to 1. In FIG. 7A, in burst period 705, initiating STA 720 sends an FTM request 722 to responding STA 710, which, in response to receiving FTM request 722, sends an ACK frame 724 to initiating STA 720. Responding STA 710 then starts to send a first FTM frame FTM_1 726 to initiating STA 720. Initiating STA 720 sends an ACK 728 to responding STA 710 upon receiving FTM_1 726. Responding STA 710 then sends a second FTM frame FTM_2 730 to initiating STA 720. Upon receiving FTM_2 730, initiating STA 720 sends an ACK frame 732 to responding STA 710. Similar processes can be carried out in the next burst instance as shown by FTM request frame 734, ACK frame 736, FTM_3 738, ACK frame 740, FTM_4 742 and ACK frame 744.

The first FTM frame of each burst instance, such as FTM frames FTM_1 726 or FTM_3 738, may include partial TSFs of FTM request frames 722 or 734. The format and fields of FTM frames FTM_1 726 and FTM_3 738 may be the same as FTM frame 500 or 550 shown in FIG. 5A or 5B, or FTM frame 600 or 650 shown in FIG. 6A or 6B, as described above. The value in the partial TSF of FTM request frame field may be a timestamp captured at responding STA 710 at the time of arrival of the FTM request frames 722 or 734, as indicated by t0_1 and t0_3 in FIG. 7A.

Figure 7B:
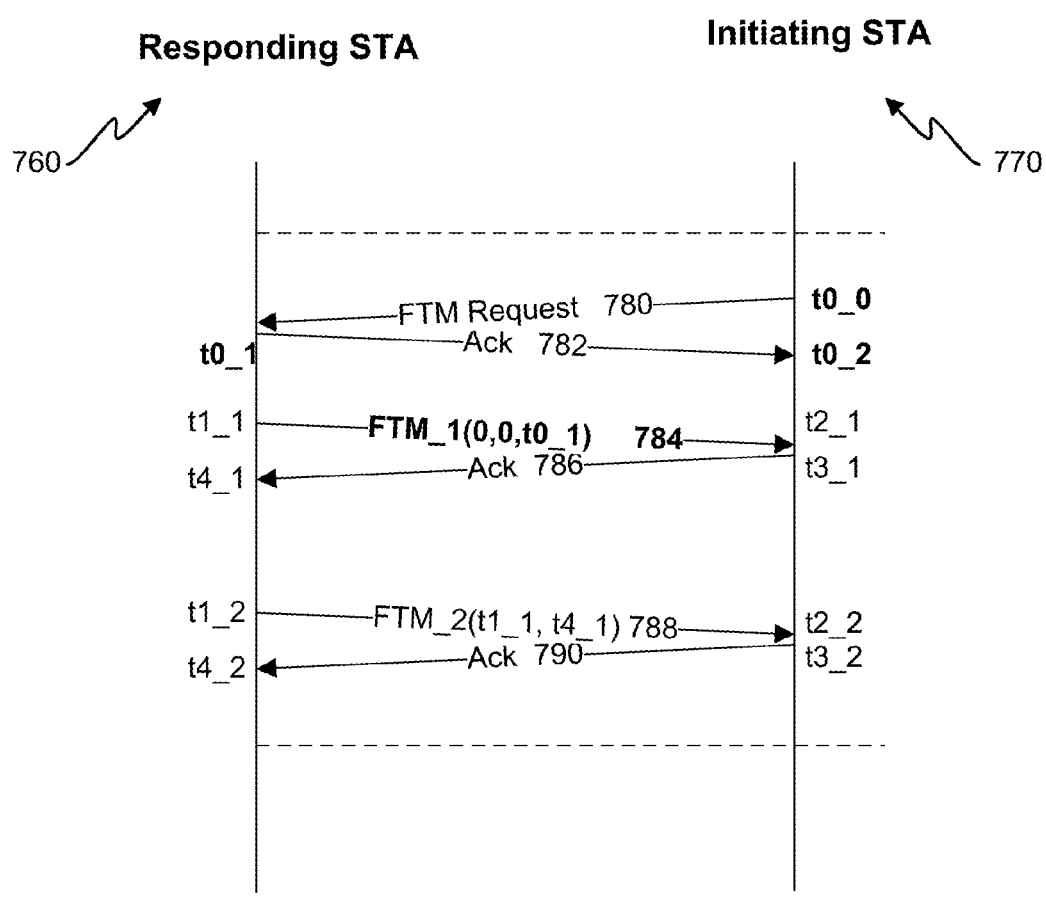
FIG. 7B illustrates an FTM session according to another embodiment of the present disclosure.

FIG. 7B illustrates an FTM session 750 according to another embodiment of the present disclosure, where initiating STA 770 requests a single burst of fine timing measurement to be taken as soon as possible by setting a Number of Bursts Exponent field (B8-B11 of FIG. 5C) to 0 and the ASAP field to 1. In FIG. 7B, initiating STA 770 sends an FTM request 780 to responding STA 760, which, in response to receiving FTM request 780, sends an ACK frame 782 to initiating STA 770. Responding STA 760 then starts to send a first FTM frame FTM_1 784 to initiating STA 770. Initiating STA 770 sends an ACK frame 786 to responding STA 760 upon receiving FTM_1 784. Responding STA 760 then sends a second FTM frame FTM_2 788 to initiating STA 770. Upon receiving FTM_2 788, initiating STA 770 sends an ACK frame 790 to responding STA 760.

The first FTM frame of the single burst, for example, FTM frame FTM_1 784, may include partial TSF of FTM request frame 780. The format of FTM frame FTM_1 784 may be the same as FTM frame 500 or 550 in FIG. 5A or 5B, or FTM frame 600 or 650 in FIG. 6A or 6B, as described above. The value in the partial TSF of FTM request frame field may be a timestamp captured at responding STA 760 at a time of arrival of the FTM request 780.

FIGS. 7A and 7B also illustrate some other embodiments of possible values of the partial TSF embedded in a FTM frame. For example, as shown in FIG. 7A, rather than capturing timestamp t0_1 at responding STA 710 at the time of arrival of FTM request 722 and converting the captured timestamp t0_1 to a partial TSF to be embedded into FTM frame FTM_1 726, the time of departure of the current FTM frame FTM_1 726 (t1_1) at responding STA 710 can be captured and converted to a partial TSF, and embedded into FTM frame FTM_1 726. After receiving FTM frame FTM_1 726, initiating STA 720 may use the partial TSF of t1_1 and a time of arrival of FTM frame FTM_1 726 at initiating STA 720 (t2_1) for synchronization.

As another example, in FIG. 7B, rather than capturing the timestamp at responding STA 760 at the time of arrival of FTM request 780 and converting the captured timestamp to a partial TSF to be embedded into FTM frame FTM_1 784, the time of departure of ACK frame 782 (t0_1) at responding STA 760 can be captured and converted to a partial TSF, and embedded into FTM frame FTM_1 784. Initiating STA 770 may capture the time of arrival t0_2 of ACK frame 782 at initiating STA 770. After receiving FTM frame FTM_1 784, initiating STA 770 may use the partial TSF of t0_1 and the captured time of arrival t0_2 of ACK frame 782 at initiating STA 770 for synchronization.

Even though the above embodiments are described in specific examples, their applications are not limited to the specific examples described above. Rather, the embodiments of possible values of partial TSF or full TSF used for time synchronization can be implemented in a first FTM frame after a FTM request under various settings, regardless of whether the FTM session is set to multiple bursts or single burst, and whether ASAP is set to 0 or 1. For example, the value of the partial TSF or full TSF may be any one of the time of arrival of an FTM request at the responding STA, the time of departure of an ACK frame from the responding STA in response to the FTM request, or the time of departure of a first FTM frame from the responding STA, in either multiple-burst or single-burst mode, with ASAP being set to either 0 or 1.

IV. Example Methods

FIGS. 8A-8D illustrate some embodiments of timing synchronization methods on an initiating STA disclosed in the present disclosure. It is noted that even though FIGS. 8A-8D describe the operations as a sequential process, many of the operations can be performed in parallel or concurrently. In addition, the order of the operations may be rearranged. An operation may have additional steps not included in the figure. Some operations may be optional, and thus may be omitted in various embodiments. Some operations described in one block may be performed together with operations at another block. Furthermore, embodiments of the methods may be implemented in hardware, software, firmware, middleware, microcode, hardware description languages, or any combination thereof.

Figure 8A:
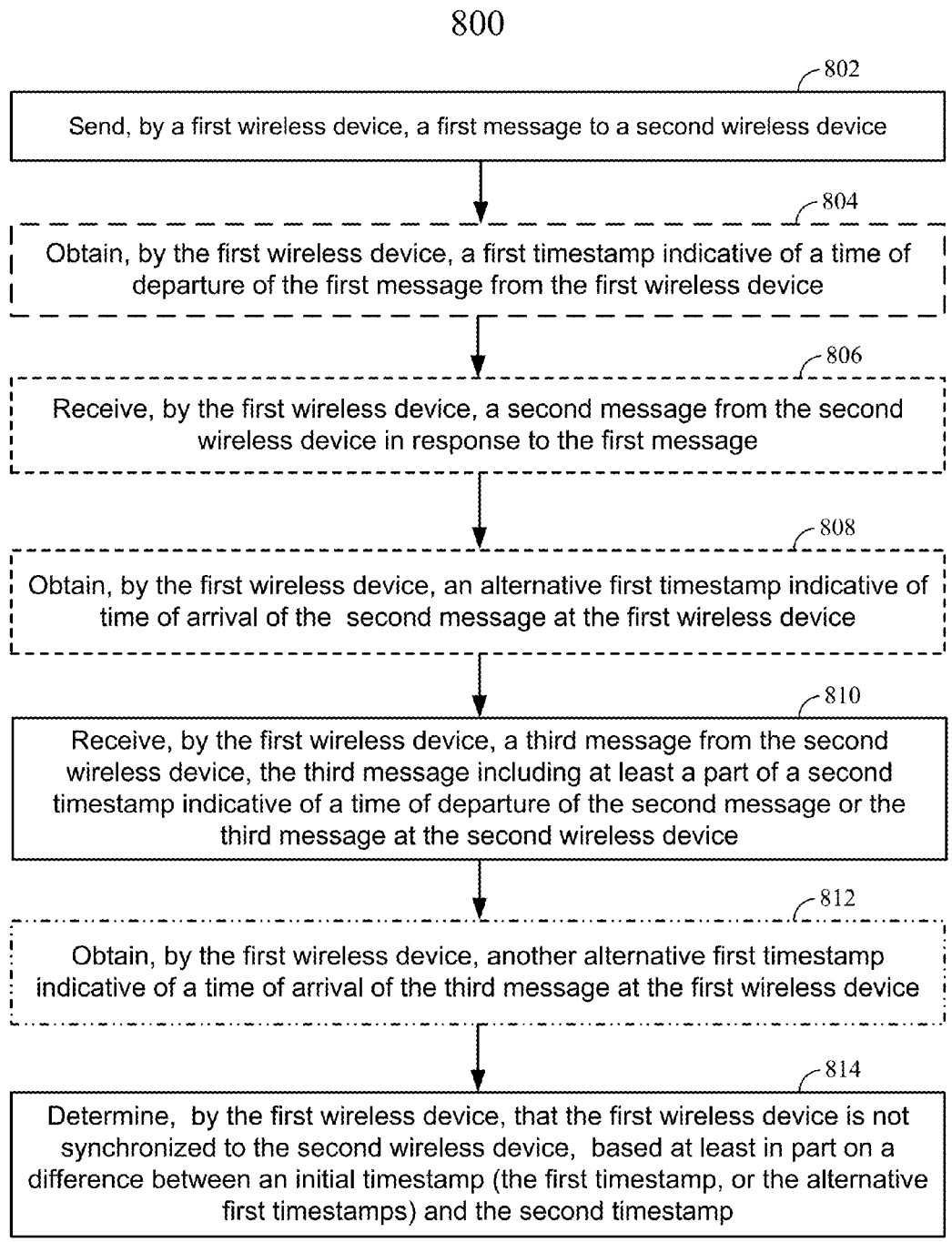
FIG. 8A is a flow chart illustrating some embodiments of methods of timing synchronization on an initiating wireless device using partial timing synchronization function timestamp in an FTM frame.

FIG. 8A is a flow chart 800 illustrating some embodiments of methods of timing synchronization on an initiating wireless device using partial timing synchronization function timestamp in an FTM frame.

Figure 10:
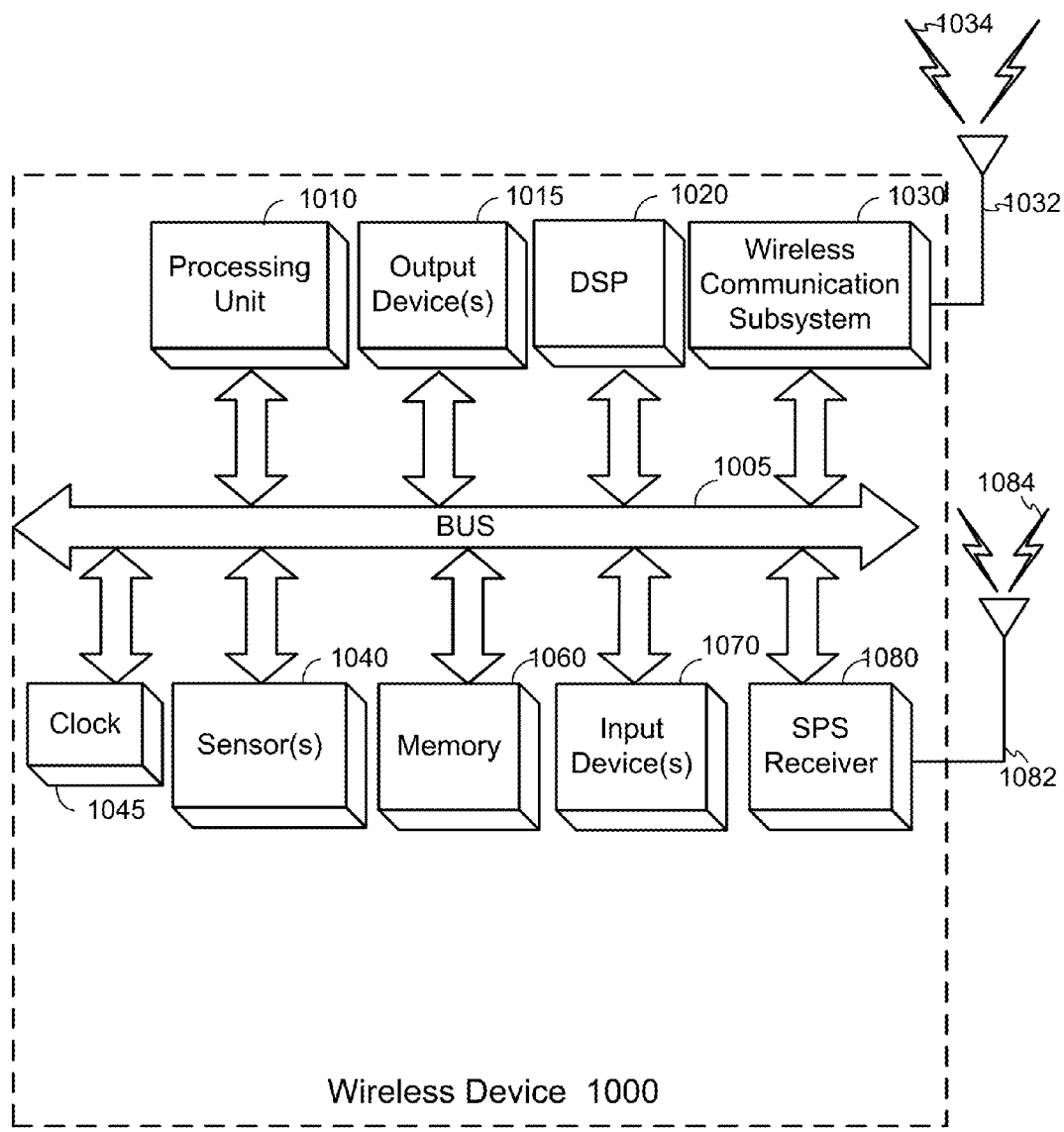
FIG. 10 is a block diagram of an embodiment of a wireless device.
Figure 11:
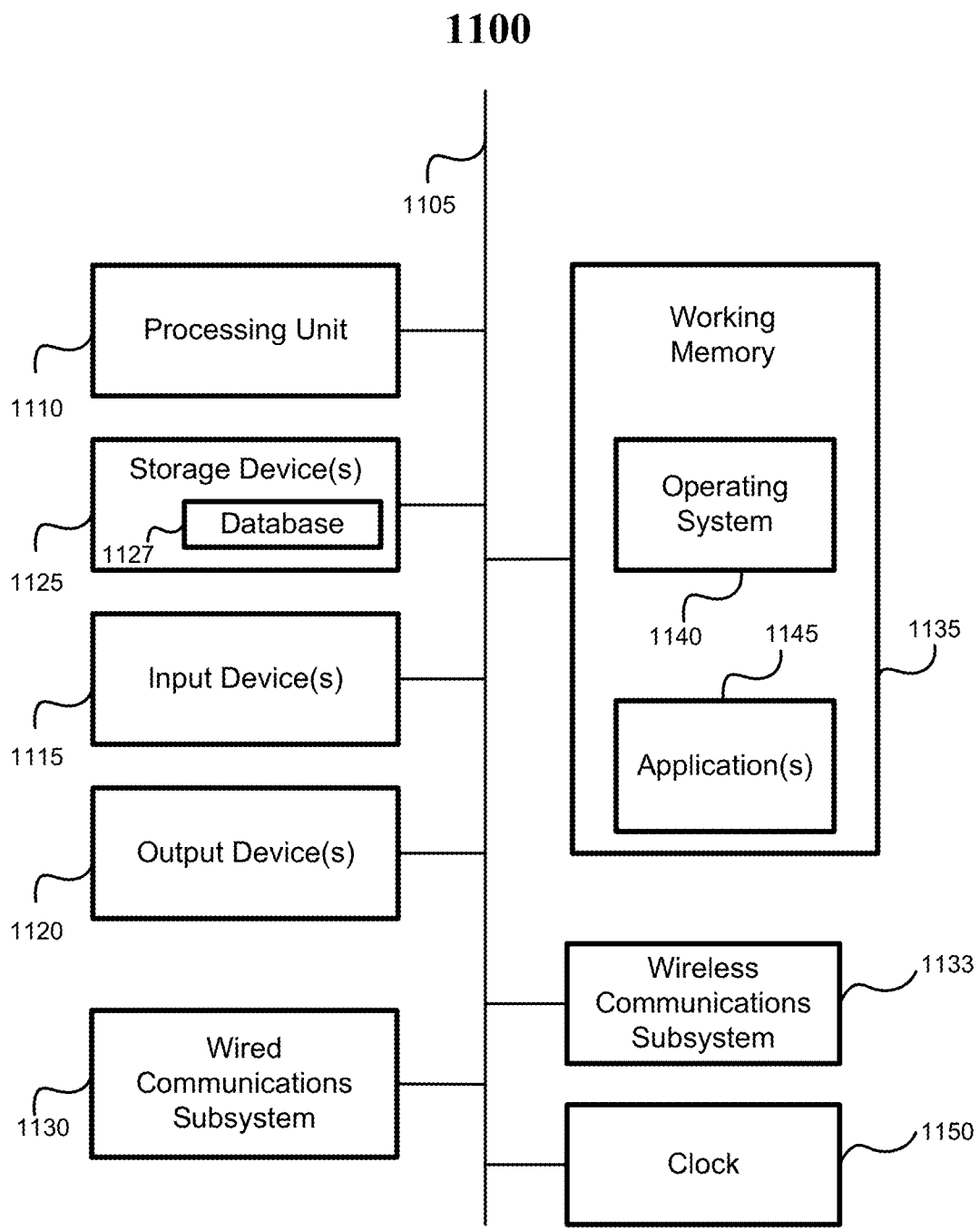
FIG. 11 is a block diagram of an embodiment of a computing device.

At block 802, a first wireless device, such as initiating STA 420, 720, or 770, sends a first message to a second wireless device, such as responding STA 410, 710, or 760. The first message may be an initial FTM request frame, such as initial FTM request frame 430 in FIG. 4, or a non-initial FTM request frame, such as FTM request frame 438 or 450 in FIG. 4, FTM request frame 722 or 734 in FIG. 7A, or FTM request frame 780 in FIG. 7B. Means for performing the function at block 802 may include but are not limited to, for example, wireless communication subsystem 1030, processing unit 1010, memory 1060, and/or bus 1005 as illustrated in FIG. 10 and described in detail below. In some embodiments, means for performing the function at block 802 may include but are not limited to, for example, wireless communications subsystem 1133, processing unit 1110, working memory 1135, and/or bus 1105 as illustrated in FIG. 11 and described in detail below.

At block 804, the first wireless device may optionally capture or otherwise obtain a first timestamp, which indicates a time of departure of the first message from the first wireless device. The first wireless device may obtain the first timestamp based on a local clock running on the first wireless device. The first timestamp may be, for example, t0_0, t0_2 or t0_4 in FIG. 4, t0_0 or t0_2 in FIG. 7A, or t0_0 in FIG. 7B. Means for performing the function at block 804 may include but are not limited to, for example, clock 1045, processing unit 1010, memory 1060, input device(s) 1070, and/or bus 1005 as illustrated in FIG. 10 and described in detail below. In some embodiments, means for performing the function at block 804 may include but are not limited to, for example, clock 1150, processing unit 1110, working memory 1135, and/or bus 1105 as illustrated in FIG. 11 and described in detail below.

Optionally, at block 806, the first wireless device may receive a second message from the second wireless device in response to the first message. The second message may be an acknowledgement message from the second wireless device to the first wireless device indicating the successful reception of the first message. For example, the second message may be one of ACK frame 432, 440 or 452 in FIG. 4, ACK frame 724 or 736 in FIG. 7A, or ACK frame 782 in FIG. 7B. Means for performing the function at block 806 may include but are not limited to, for example, wireless communication subsystem 1030, processing unit 1010, memory 1060, and/or bus 1005 as illustrated in FIG. 10. In some embodiments, means for performing the function at block 806 may include but are not limited to, for example, wireless communications subsystem 1133, processing unit 1110, working memory 1135, and/or bus 1105 as illustrated in FIG. 11 and described in detail below.

At block 808, the first wireless device may capture or otherwise obtain an alternative first timestamp at a time of arrival of the second message at the first wireless device, such as t0_2 shown in FIG. 7B that indicates the time of arrival of ACK frame 782 at initiating STA 770. Means for performing the function at block 808 may include but are not limited to, for example, clock 1045, processing unit 1010, memory 1060, input device(s) 1070, and/or bus 1005 as illustrated in FIG. 10. In some embodiments, means for performing the function at block 808 may include but are not limited to, for example, clock 1150, processing unit 1110, working memory 1135, and/or bus 1105 as illustrated in FIG. 11 and described in detail below.

At block 810, the first wireless device receives a third message from the second wireless device. The third message may be an FTM frame, such as, for example, FTM_1 434, FTM_2 442, or FTM_4 454 in FIG. 4, FTM_1 726 or FTM_3 738 in FIG. 7A, or FTM_1 784 in FIG. 7B. The third message may include at least a part of a second timestamp obtained by the second wireless device. The second timestamp may be captured by the second wireless device at a time of arrival of the first message at the second wireless device, such as t0_1, t0_3, or t0_5 in FIG. 4; at a time of departure of the second message sent by the second wireless device to the first wireless device, such as t0_1 in FIG. 7B; or at a time of departure of the third message from the second wireless device, such as t1_1 or t1_3 in FIG. 7A. The second wireless device may capture the second timestamp based on a local clock running on the second wireless device. Means for performing the function at block 810 may include but are not limited to, for example, wireless communication subsystem 1030, processing unit 1010, memory 1060, clock 1045, and/or bus 1005 as illustrated in FIG. 10. In some embodiments, means for performing the function at block 810 may include but are not limited to, for example, wireless communications subsystem 1133, processing unit 1110, working memory 1135, clock 1150, and/or bus 1105 as illustrated in FIG. 11 and described in detail below.

At block 812, the first wireless device may optionally capture or otherwise obtain another alternative first timestamp at a time of arrival of the third message at the first wireless device, such as t2_2 and t2_4 of FIG. 4, t2_1 and t2_3 of FIG. 7A, or t2_1 of FIG. 7B, which may also be used for round trip time calculation in fine timing measurement. Means for performing the function at block 812 may include but are not limited to, for example, clock 1045, processing unit 1010, memory 1060, input device(s) 1070, and/or bus 1005 as illustrated in FIG. 10. In some embodiments, means for performing the function at block 812 may include but are not limited to, for example, clock 1150, processing unit 1110, working memory 1135, and/or bus 1105 as illustrated in FIG. 11 and described in detail below.

At block 814, the first wireless device determines that the first wireless device is not synchronized to the second wireless device, based at least in part on a difference between an initial timestamp (the first timestamp or the alternative first timestamps) and the second timestamp. The determination that the first wireless device is not synchronized to the second wireless device may also be based on the round trip time between the first wireless device and the second wireless device. For example, if a difference between the first timestamp (or the alternative first timestamp) and the second timestamp is different from a half of the round trip time, the first wireless device and the second wireless device may not be synchronized. Means for performing the function at block 814 may include but are not limited to, for example, processing unit 1010, memory 1060, and/or bus 1005 as illustrated in FIG. 10. In some embodiments, means for performing the function at block 814 may include but are not limited to, for example, processing unit 1110, working memory 1135, and/or bus 1105 as illustrated in FIG. 11 and described in detail below.

In one embodiment, in response to a determination that the first wireless device is not synchronized to the second wireless device, the first wireless device may adjust its timer or local clock. The adjustment may be based at least partially on the received second timestamp, the obtained first timestamp (or the alternative first timestamp), or the round trip time between the first wireless device and the second wireless device. Means for performing the timer adjustment function may include but are not limited to, for example, clock 1045, processing unit 1010, memory 1060, input device(s) 1070, and/or bus 1005 as illustrated in FIG. 10. In some embodiments, means for performing the timer adjustment function may include but are not limited to, for example, clock 1150, processing unit 1110, working memory 1135, and/or bus 1105 as illustrated in FIG. 11 and described in detail below.

Figure 8B:
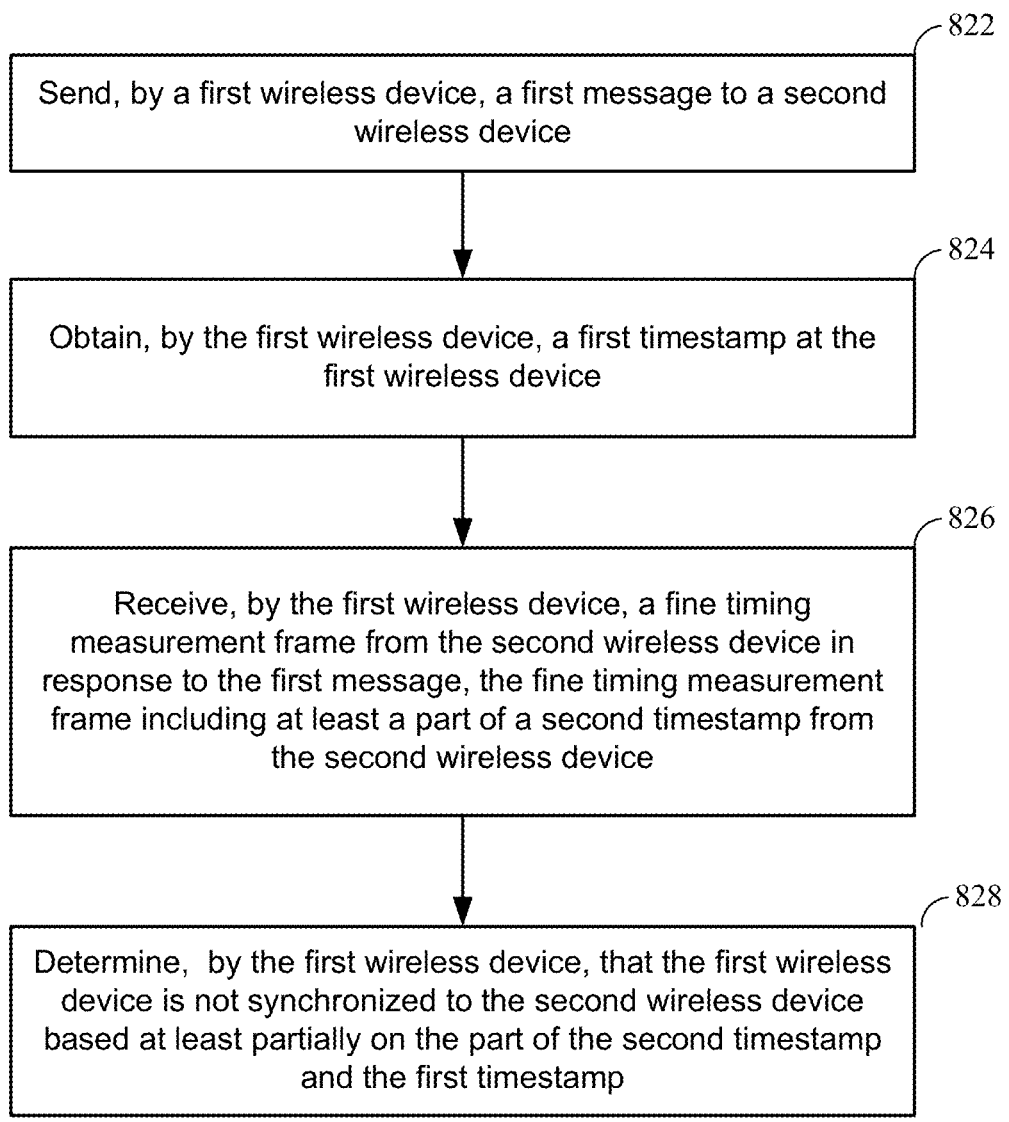
FIG. 8B is a flow chart illustrating an embodiment of a method of timing synchronization on a wireless device using partial timing synchronization function timestamp in an FTM frame.

FIG. 8B is a flow chart 820 illustrating an embodiment of a method of timing synchronization on a wireless device using partial timing synchronization function timestamp in an FTM frame. FIG. 8B may be better understood with reference to, for example, diagram 400 of FIG. 4, FTM session 700 of FIG. 7A, or FTM session 750 of FIG. 7B.

At block 822, a first wireless device, such as initiating STA 420 of FIG. 4, sends a first message to a second wireless device, such as responding STA 410 of FIG. 4. The first message may be an initial FTM request frame as shown by initial FTM request 430 in FIG. 4, or a non-initial FTM request, such as FTM request frame 438 or 450 in FIG. 4. Means for performing the function at block 822 may include but are not limited to, for example, wireless communication subsystem 1030, processing unit 1010, memory 1060, and/or bus 1005 as illustrated in FIG. 10 and described in detail below. In some embodiments, means for performing the function at block 822 may include but are not limited to, for example, wireless communications subsystem 1133, processing unit 1110, working memory 1135, and/or bus 1105 as illustrated in FIG. 11 and described in detail below.

At block 824, the first wireless device captures or otherwise obtains a first timestamp. The first wireless device may capture the first timestamp based on a local clock running on the first wireless device. For example, the first timestamp may be based on a time of departure of the first message, such as initial FTM request 430 in FIG. 4, or a non-initial FTM request, such as FTM request frame 438 or 450 in FIG. 4, from the first wireless device. The first timestamp may be, for example, t0_0, t0_2 or t0_4 in FIG. 4. The first timestamp may also be based on a time of arrival at the first wireless device of a message (such as a fine timing measurement frame or an acknowledgment frame) from the second wireless device as described below. Means for performing the function at block 824 may include but are not limited to, for example, clock 1045, processing unit 1010, memory 1060, input device(s) 1070, and/or bus 1005 as illustrated in FIG. 10 and described in detail below. In some embodiments, means for performing the function at block 824 may include but are not limited to, for example, clock 1150, processing unit 1110, working memory 1135, and/or bus 1105 as illustrated in FIG. 11 and described in detail below.

At block 826, the first wireless device receives a fine timing measurement frame from the second wireless device in response to the first message. The fine timing measurement frame may be, for example, FTM_1 434, FTM_2 442, or FTM_4 454 in FIG. 4. The fine timing measurement frame may include at least a part of a second timestamp from the second wireless device. The second timestamp may be captured by the second wireless device at a time of arrival of the first message at the second wireless device, such as t0_1, t0_3, or t0_5 in FIG. 4. In some embodiments, the second timestamp may be captured by the second wireless device at a time of departure of a fine timing measurement frame at the second wireless device, such as t1_1 or t1_3 in FIG. 7A. The second timestamp may also be captured by the second wireless device at a time of departure of an acknowledgement frame at the second wireless device, such as t0_1 in FIG. 7B. The second wireless device may capture the second timestamp based on a local clock running on the second wireless device. Means for performing the function at block 826 may include but are not limited to, for example, wireless communication subsystem 1030, processing unit 1010, memory 1060, clock 1045, and/or bus 1005 as illustrated in FIG. 10. In some embodiments, means for performing the function at block 826 may include but are not limited to, for example, wireless communications subsystem 1133, processing unit 1110, working memory 1135, clock 1150, and/or bus 1105 as illustrated in FIG. 11 and described in detail below.

At block 828, the first wireless device determines that the first wireless device is not synchronized to the second wireless device based at least partially on the part of a second timestamp and the first timestamp. The determination of whether the first wireless device is synchronized to the second wireless device may also be based on the round trip time between the first wireless device and the second wireless device. For example, if a difference between the first timestamp and the second timestamp is different from a half of the round trip time, the first wireless device and the second wireless device may not be synchronized. Means for performing the function at block 828 may include but are not limited to, for example, processing unit 1010, memory 1060, and/or bus 1005 as illustrated in FIG. 10. In some embodiments, means for performing the function at block 828 may include but are not limited to, for example, processing unit 1110, working memory 1135, and/or bus 1105 as illustrated in FIG. 11 and described in detail below.

In one embodiment, in response to a determination that the first wireless device is not synchronized to the second wireless device, the first wireless device may adjust its timer or local clock based at least partially on the part of the second timestamp. The first wireless device may also adjust its timer or local clock based on the first timestamp or the round trip time between the first wireless device and the second wireless device. Means for performing the timer adjustment function may include but are not limited to, for example, clock 1045, processing unit 1010, memory 1060, input device(s) 1070, and/or bus 1005 as illustrated in FIG. 10. In some embodiments, means for performing the timer adjustment function may include but are not limited to, for example, clock 1150, processing unit 1110, working memory 1135, and/or bus 1105 as illustrated in FIG. 11 and described in detail below.

Figure 8C:
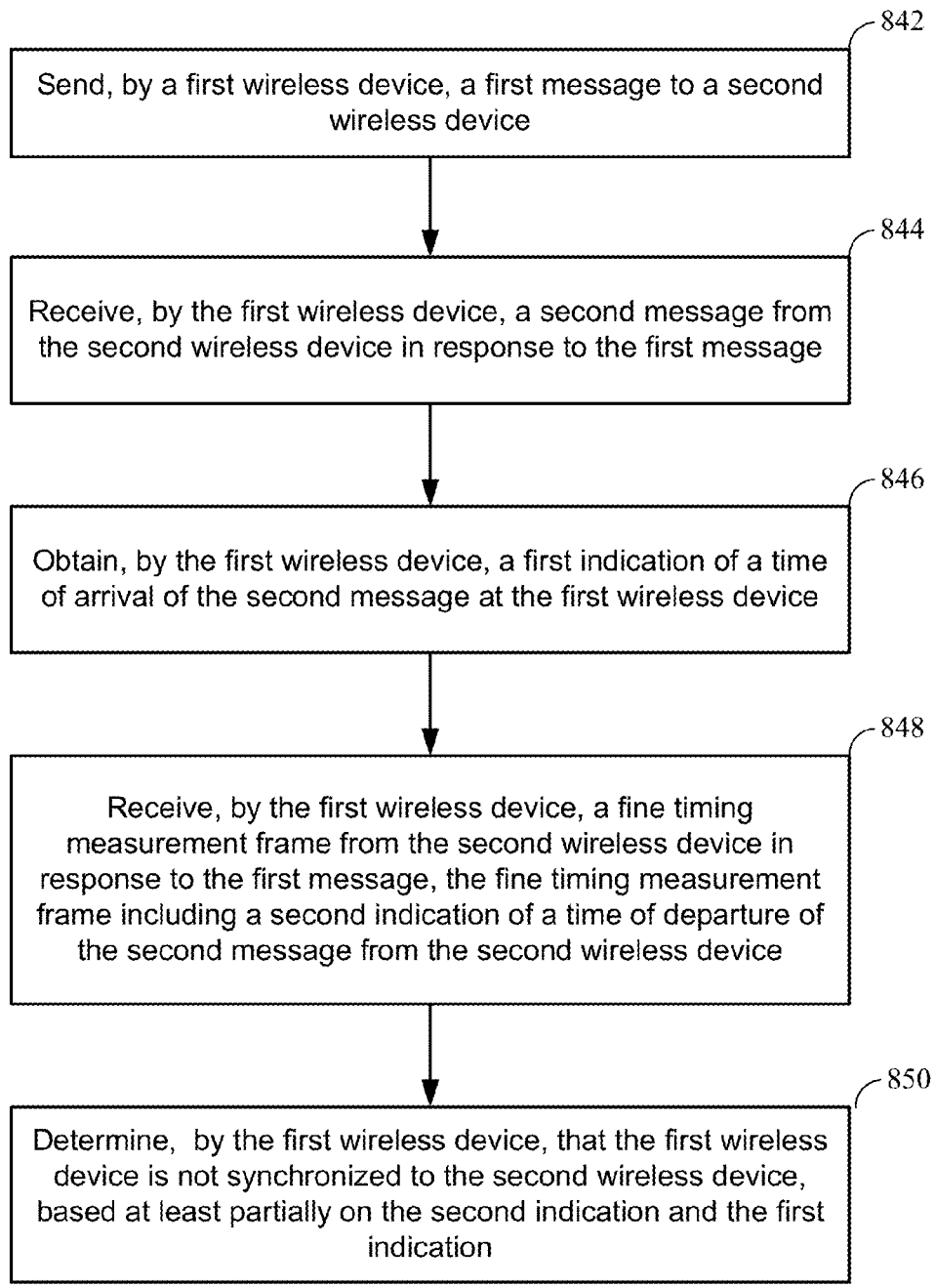
FIG. 8C is a flow chart illustrating another embodiment of a method of timing synchronization on a wireless device using partial timing synchronization function timestamp in an FTM frame.

FIG. 8C is a flow chart 840 illustrating another embodiment of a method of timing synchronization on a wireless device using partial timing synchronization function timestamp in an FTM frame. FIG. 8C may be better understood with reference to, for example, FTM session 750 of FIG. 7B.

At block 842, a first wireless device, such as initiating STA 770 in FIG. 7B, sends a first message to a second wireless device, such as responding STA 760. The first message may be a non-initial FTM request, such as FTM request frame 780 in FIG. 7B. Means for performing the function at block 842 may include but are not limited to, for example, wireless communication subsystem 1030, processing unit 1010, memory 1060, and/or bus 1005 as illustrated in FIG. 10 and described in detail below. In some embodiments, means for performing the function at block 842 may include but are not limited to, for example, wireless communications subsystem 1133, processing unit 1110, working memory 1135, and/or bus 1105 as illustrated in FIG. 11 and described in detail below.

At block 844, the first wireless device may receive a second message from the second wireless device in response to the first message. The second message may be an acknowledgement message sent by the second wireless device to the first wireless device indicating the successful reception of the first message. For example, the second message may be ACK frame 782 in FIG. 7B. Means for performing the function at block 844 may include but are not limited to, for example, wireless communication subsystem 1030, processing unit 1010, memory 1060, and/or bus 1005 as illustrated in FIG. 10 and described in detail below. In some embodiments, means for performing the function at block 844 may include but are not limited to, for example, wireless communications subsystem 1133, processing unit 1110, working memory 1135, and/or bus 1105 as illustrated in FIG. 11 and described in detail below.

At block 846, the first wireless device may obtain a first indication a time of arrival of the second message at the first wireless device, such as t0_2 shown in FIG. 7B that indicates the time of arrival of ACK frame 782 at initiating STA 770. Means for performing the function at block 846 may include but are not limited to, for example, clock 1045, processing unit 1010, memory 1060, input device(s) 1070, and/or bus 1005 as illustrated in FIG. 10 and described in detail below. In some embodiments, means for performing the function at block 846 may include but are not limited to, for example, clock 1150, processing unit 1110, working memory 1135, and/or bus 1105 as illustrated in FIG. 11 and described in detail below.

At block 848, the first wireless device receives a fine timing measurement frame, such as FTM_1 784 in FIG. 7B, from the second wireless device in response to the first message. The fine timing measurement frame may include a second indication of a time of departure of the second message from the second wireless device, such as t0_1 in FIG. 7B. The second wireless device may capture the second indication based on a local clock running on the second wireless device. Means for performing the function at block 848 may include but are not limited to, for example, wireless communication subsystem 1030, processing unit 1010, memory 1060, clock 1045, and/or bus 1005 as illustrated in FIG. 10. In some embodiments, means for performing the function at block 848 may include but are not limited to, for example, wireless communications subsystem 1133, processing unit 1110, working memory 1135, clock 1150, and/or bus 1105 as illustrated in FIG. 11 and described in detail below At block 850, the first wireless device determines that the first wireless device is not synchronized to the second wireless device, based at least partially on the first indication and the second indication. The determination that the first wireless device is not synchronized to the second wireless device may also be based on the round trip time between the first wireless device and the second wireless device. For example, if a difference between the first indication and the second indication is different from a half of the round trip time, the first wireless device and the second wireless device may not be synchronized. Means for performing the function at block 850 may include but are not limited to, for example, processing unit 1010, memory 1060, and/or bus 1005 as illustrated in FIG. 10. In some embodiments, means for performing the function at block 850 may include but are not limited to, for example, processing unit 1110, working memory 1135, and/or bus 1105 as illustrated in FIG. 11 and described in detail below.

In one embodiment, in response to a determination that the first wireless device is not synchronized to the second wireless device, the first wireless device may adjust its timer or local clock based at least partially on the second indication. The first wireless device may also adjust its timer or local clock based on the first indication or the round trip time between the first wireless device and the second wireless device. Means for performing the timer adjustment function may include but are not limited to, for example, clock 1045, processing unit 1010, memory 1060, input device(s) 1070, and/or bus 1005 as illustrated in FIG. 10. In some embodiments, means for performing the timer adjustment function may include but are not limited to, for example, clock 1150, processing unit 1110, working memory 1135, and/or bus 1105 as illustrated in FIG. 11 and described in detail below.

Figure 8D:
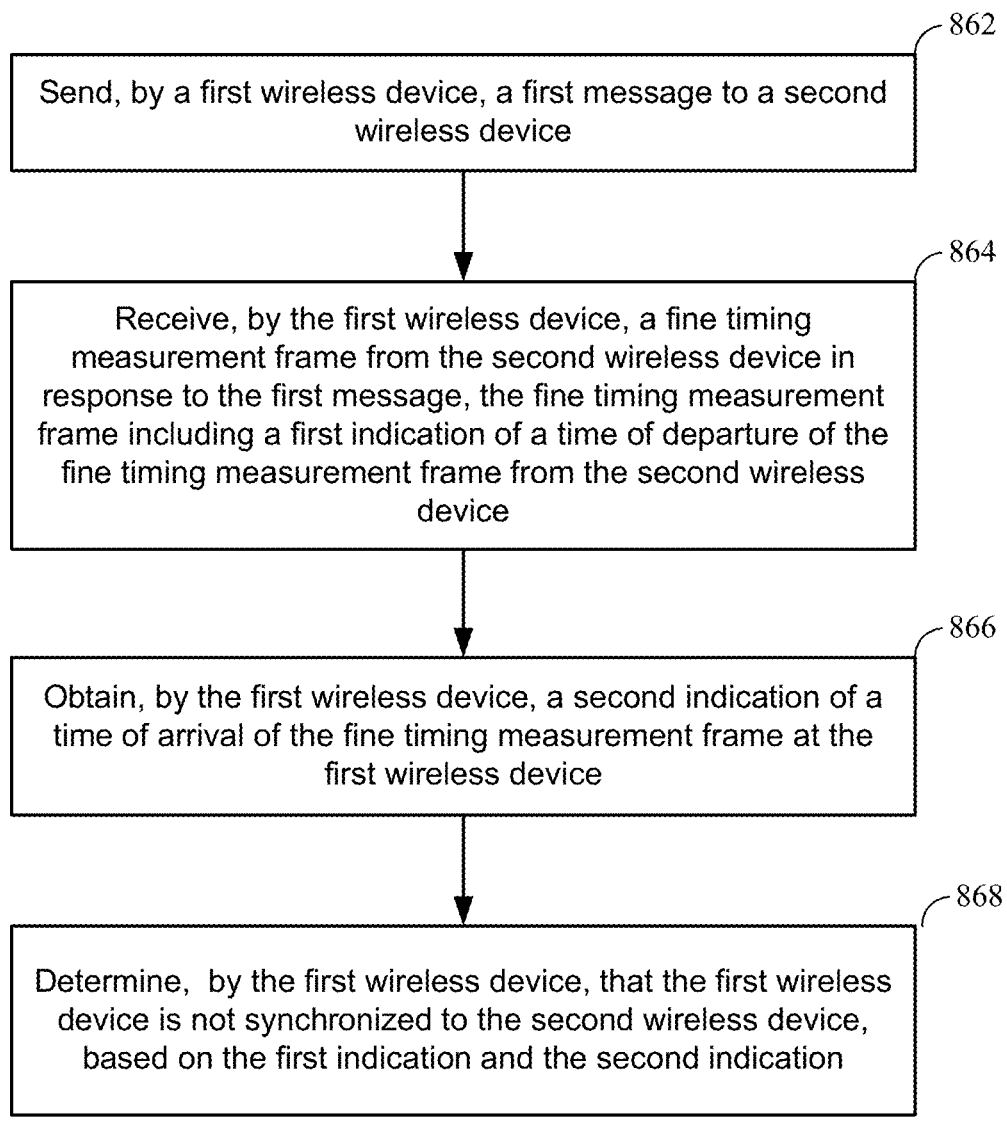
FIG. 8D is a flow chart illustrating another embodiment of a method of timing synchronization on a wireless device using partial timing synchronization function timestamp in an FTM frame.

FIG. 8D is a flow chart 860 illustrating one embodiment of a method of timing synchronization on a wireless device using partial timing synchronization function timestamp in an FTM frame. FIG. 8D may be better understood with reference to, for example, FTM session 700 of FIG. 7A.

At block 862, a first wireless device, such as initiating STA 720 of FIG. 7A, sends a first message to a second wireless device, such as responding STA 710. The first message may be an initial FTM request frame, or a non-initial FTM request, such as FTM request frame 722 or 734 in FIG. 7A. Means for performing the function at block 862 may include but are not limited to, for example, wireless communication subsystem 1030, processing unit 1010, memory 1060, and/or bus 1005 as illustrated in FIG. 10 and described in detail below. In some embodiments, means for performing the function at block 862 may include but are not limited to, for example, wireless communications subsystem 1133, processing unit 1110, working memory 1135, and/or bus 1105 as illustrated in FIG. 11 and described in detail below.

At block 864, the first wireless device receives a fine timing measurement frame from the second wireless device. The fine timing measurement frame may be, for example, FTM_1 726 or FTM_3 738 in FIG. 7A. The fine timing measurement frame may include a first indication of a time of departure of the fine timing measurement frame from the second wireless device, such as t1_1 or t1_3 in FIG. 7A. The second wireless device may capture the first indication based on a local clock running on the second wireless device. Means for performing the function at block 864 may include but are not limited to, for example, wireless communication subsystem 1030, processing unit 1010, memory 1060, clock 1045, and/or bus 1005 as illustrated in FIG. 10. In some embodiments, means for performing the function at block 864 may include but are not limited to, for example, wireless communications subsystem 1133, processing unit 1110, working memory 1135, clock 1150, and/or bus 1105 as illustrated in FIG. 11 and described in detail below At block 866, the first wireless device captures or otherwise obtains a second indication of a time of arrival of the fine timing measurement frame at the first wireless device, such as t2_1 or t2_3 in FIG. 7A, which may also be used for round trip time calculation in fine timing measurement. Means for performing the function at block 866 may include but are not limited to, for example, clock 1045, processing unit 1010, memory 1060, input device(s) 1070, and/or bus 1005 as illustrated in FIG. 10 and described in detail below. In some embodiments, means for performing the function at block 866 may include but are not limited to, for example, clock 1150, processing unit 1110, working memory 1135, and/or bus 1105 as illustrated in FIG. 11 and described in detail below.

At block 868, the first wireless device determines that the first wireless device is not synchronized to the second wireless device, based on the first indication and the second indication. The determination that the first wireless device is not synchronized to the second wireless device may also be based on the round trip time between the first wireless device and the second wireless device. For example, if a difference between the first indication and the second indication is different from a half of the round trip time, the first wireless device and the second wireless device may not be synchronized. Means for performing the function at block 868 may include but are not limited to, for example, processing unit 1010, memory 1060, and/or bus 1005 as illustrated in FIG. 10. In some embodiments, means for performing the function at block 868 may include but are not limited to, for example, processing unit 1110, working memory 1135, and/or bus 1105 as illustrated in FIG. 11 and described in detail below.

In one embodiment, in response to a determination that the first wireless device is not synchronized to the second wireless device, the first wireless device may adjust its timer or local clock based at least partially on the first indication. The first wireless device may also adjust its timer or local clock based on the second indication or the round trip time between the first wireless device and the second wireless device. Means for performing the timer adjustment function may include but are not limited to, for example, clock 1045, processing unit 1010, memory 1060, input device(s) 1070, and/or bus 1005 as illustrated in FIG. 10. In some embodiments, means for performing the timer adjustment function may include but are not limited to, for example, clock 1150, processing unit 1110, working memory 1135, and/or bus 1105 as illustrated in FIG. 11 and described in detail below.

Figure 9:
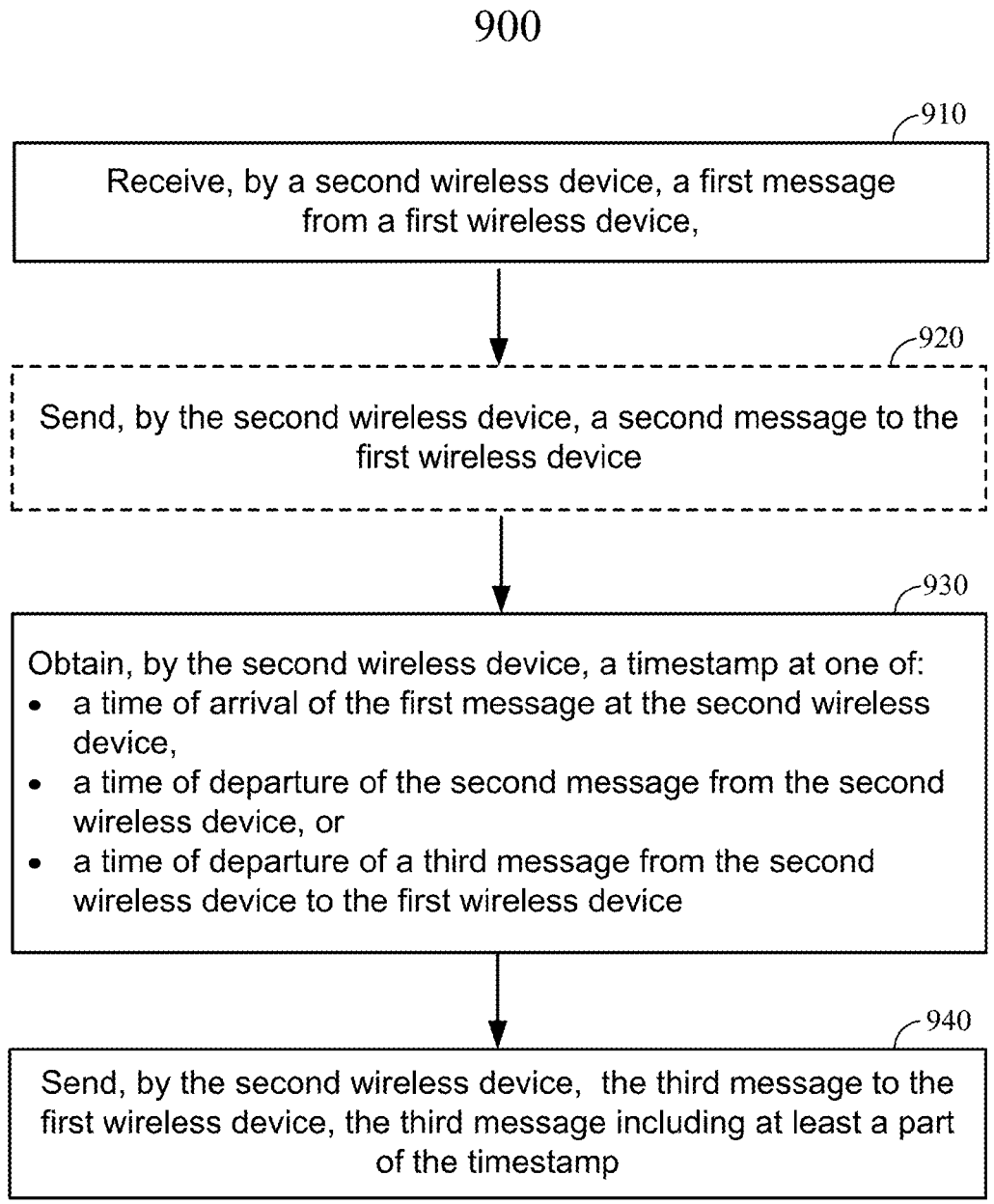
FIG. 9 is a flow chart illustrating an embodiment of a method of timing synchronization on a responding wireless device using partial timing synchronization function timestamp in an FTM frame.

FIG. 9 is a flow chart 900 illustrating an embodiment of a method of timing synchronization on a responding STA using partial timing synchronization function timestamp in an FTM frame. It is noted that even though FIG. 9 describe the operations as a sequential process, many of the operations can be performed in parallel or concurrently. In addition, the order of the operations may be rearranged. An operation may have additional steps not included in the figure. Some operations may be optional, and thus may be omitted in various embodiments. Some operations described in one block may be performed together with operations at another block. Furthermore, embodiments of the methods may be implemented in hardware, software, firmware, middleware, microcode, hardware description languages, or any combination thereof.

At block 910, a second wireless device, such as a responding STA, receives a first message from a first wireless device, such as a initiating STA. The first message may be an initial FTM request frame, such as initial FTM request 430 in FIG. 4, or a non-initial FTM request, such as FTM request frame 438 or 450 in FIG. 4, FTM request frame 722 or 734 in FIG. 7A, or FTM request frame 780 in FIG. 7B. In some embodiments, means for performing the function at block 910 may include but are not limited to, for example, wireless communication subsystem 1030, processing unit 1010, memory 1060, and/or bus 1005 as illustrated in FIG. 10 and described in detail below. In some embodiments, means for performing the function at block 910 may include but are not limited to, for example, wireless communications subsystem 1133, processing unit 1110, working memory 1135, and/or bus 1105 as illustrated in FIG. 11 and described in detail below.

At block 920, after receiving the first message from the first wireless device, the second wireless device may send a second message to the first wireless device. The second message may be an acknowledgement message sent by the second wireless device to the first wireless device indicating the successful reception of the first message. For example, the second message may be one of ACK frame 432, 440 or 452 in FIG. 4, ACK frame 724 or 736 in FIG. 7A, or ACK frame 782 in FIG. 7B. In some embodiments, means for performing the function at block 920 may include but are not limited to, for example, wireless communication subsystem 1030, processing unit 1010, memory 1060, and/or bus 1005 as illustrated in FIG. 10 and described in detail below. In some embodiments, means for performing the function at block 920 may include but are not limited to, for example, wireless communications subsystem 1133, processing unit 1110, working memory 1135, and/or bus 1105 as illustrated in FIG. 11 and described in detail below.

At block 930, the second wireless device obtains a timestamp. The timestamp may be captured by the second wireless device at (1) a time of arrival of the first message at the second wireless device, such as t0_1, t0_3 or t0_5 in FIG. 4; (2) a time of departure of the second message from the second wireless device, such as t0_1 in FIG. 7B; or (3) a time of departure of a third message to be sent by the second wireless device to the first wireless device, such as t1_1 in FIG. 7A. In some embodiments, means for performing the function at block 930 may include but are not limited to, for example, clock 1045, processing unit 1010, memory 1060, and/or bus 1005 as illustrated in FIG. 10 and described in detail below. In some embodiments, means for performing the function at block 930 may include but are not limited to, for example, clock 1150, processing unit 1110, working memory 1135, and/or bus 1105 as illustrated in FIG. 11 and described in detail below.

At block 940, the second wireless device sends the third message to the first wireless device. The third message includes at least a part of the timestamp obtained by the second wireless device. The third message may be an FTM frame, such as, for example, FTM_1 434, FTM_2 442, or FTM_4 454 in FIG. 4, FTM_1 726 or FTM_3 738 in FIG. 7A, or FTM_1 784 in FIG. 7B. After receiving the third message, the first wireless device may determine whether the first wireless device is synchronized to the second wireless device, based at least in part on the received timestamp. In some embodiments, means for performing the function at block 940 may include but are not limited to, for example, wireless communication subsystem 1030, processing unit 1010, memory 1060, and/or bus 1005 as illustrated in FIG. 10 and described in detail below. In some embodiments, means for performing the function at block 940 may include but are not limited to, for example, wireless communications subsystem 1133, processing unit 1110, working memory 1135, and/or bus 1105 as illustrated in FIG. 11 and described in detail below.

V. Device and System Examples

FIG. 10 illustrates an embodiment of a wireless device 1000, which can be utilized as described herein above. For example, wireless device 1000 can be used as an AP and/or STA as described in relation to the embodiments previously provided herein. It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices, which may be disposed at different physical locations. In some embodiments, for example, wireless device 1000 can be a cellular telephone or other mobile electronic device. In some embodiments, wireless device 1000 may be a stationary device, such as an AP. As such, as previously indicated, components may vary from embodiment to embodiment.

Wireless device 1000 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 10, some embodiments may have a separate DSP 1020, depending on desired functionality. Wireless device 1000 also can include one or more input devices 1070, which can include without limitation a touch screen, a touch pad, microphone, button(s), dial(s), switch(es), and/or the like; and one or more output devices 1015, which can include without limitation a display, light emitting diodes (LEDs), speakers, and/or the like.

Wireless device 1000 might also include a wireless communication subsystem 1030, which can include without limitation a modem, a network card, an infrared communication device, a wireless communication device, and/or a chipset (such as a Bluetooth device, an IEEE 802.11 device (e.g., a device utilizing one or more of the 802.11 standards described herein), an IEEE 802.15.4 device, a WiFi device, a WiMax device, cellular communication facilities, etc.), and/or the like. Wireless communication subsystem 1030 may permit data to be exchanged with a network, wireless access points, other computer systems, and/or any other electronic devices described herein, such as the configuration of FIGS. 1A-1C. The communication can be carried out via one or more wireless communication antenna(s) 1032 that send and/or receive wireless signals 1034.

Depending on desired functionality, wireless communication subsystem 1030 can include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 1002.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network. A WPAN may be a Bluetooth network, an IEEE 802.15x, or some other type of network. The techniques described herein may also be used for any combination of WWAN, WLAN and/or WPAN.

Wireless device 1000 may include a clock 1045 on bus 1005, which can generate a signal to synchronize various components on bus 1005. Clock 1045 may include an inductor-capacitor (LC) oscillator, a crystal oscillator, a ring oscillator, a digital clock generator such as a clock divider or clock multiplexer, a phase locked loop, or other clock generator. As indicated previously, the clock may be synchronized (or substantially synchronized) with corresponding clocks on other wireless devices. Clock 1045 may be driven by wireless communication interface 1030, which may be used to synchronize clock 1045 of wireless device 1000 to one or more other devices.

Wireless device 1000 can further include sensor(s) 1040. Such sensors can include, without limitation, one or more accelerometer(s), gyroscope(s), camera(s), magnetometer(s), altimeter(s), microphone(s), proximity sensor(s), light sensor(s), and the like. Some or all of sensor(s) 1040 can be utilized, among other things, for dead reckoning and/or other positioning methods. Such positioning methods may be used to determine a location of wireless device 1000, and may utilize and/or complement the RTT values obtained using FTM techniques described herein.

Embodiments of the mobile device may also include a Standard Positioning Service (SPS) receiver 1080 capable of receiving signals 1084 from one or more SPS satellites using an SPS antenna 1082. Such positioning can be utilized to complement and/or incorporate the techniques for calculating RTT described herein. SPS receiver 1080 can extract a position of the mobile device, using conventional techniques, from SPS satellite vehicles (SVs) of an SPS system, such as global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, SPS receiver 1080 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS system may include any combination of one or more global and/or regional navigation satellite systems and/or augmentation systems, and SPS signals may include SPS, SPS-like, and/or other signals associated with one or more such SPS systems.

Wireless device 1000 may further include and/or be in communication with a memory 1060. Memory 1060 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Memory 1060 of wireless device 1000 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above, such as the methods shown in FIGS. 8 and/or 9 might be implemented as code and/or instructions executable by wireless device 1000, a processing unit within wireless device 1000, and/or another device of a wireless system. In an aspect, such code and/or instructions can be used to configure and/or adapt a general purpose computer (or other device) to perform one or more operations in accordance with the described methods.

FIG. 11 illustrates components of a computing system 1100, according to one embodiment. For example, computing system 1100 can be used as an AP as described in relation to the embodiments previously provided herein, and may communicate in a wireless communication system with one or more STAs, as previously discussed. In contrast to the wireless device 1000 of FIG. 10 which may be mobile, computing system 1100 of FIG. 11 may, for example, be a stationary device (or set of devices). It should be noted that FIG. 11 is meant only to provide a generalized illustration of various components, any or all of which may be utilized as appropriate. Moreover, system elements may be implemented in a relatively separated or relatively more integrated manner.

Computing system 1100 is shown comprising hardware elements that can be electrically coupled via a bus 1105 (or may otherwise be in communication, as appropriate). The hardware elements may include a processing unit 1110, including without limitation one or more general-purpose processors and/or one or more special-purpose processors (such as digital signal processing chips, graphics acceleration processors, and/or the like), one or more input devices 1115, and one or more output devices 1120. Input device(s) 1115 can include without limitation camera(s), a touchscreen, a touch pad, microphone(s), a keyboard, a mouse, button(s), dial(s), switch(es), and/or the like. Output devices 1120 may include without limitation a display device, a printer, light emitting diodes (LEDs), speakers, and/or the like.

Computing system 1100 can also include a wired communications subsystem 1130 and wireless communication technologies managed and controlled by a wireless communication subsystem 1133. As such, wired communications subsystem 1130 and wireless communications subsystem 1133 can include, without limitation, a modem, a network interface (wireless, wired, both, or other combination thereof), an infrared communication device, a wireless communication device, and/or a chipset (such as a Bluetooth™ device, an IEEE 802.11 device (e.g., a device utilizing one or more of the IEEE 802.11 standards described herein), a WiFi device, a WiMax device, cellular communication facilities, etc.), and/or the like. Subcomponents of the network interface may vary, depending on the type of computing system 1100 (e.g., mobile phone, personal computer, etc.). Wired communications subsystem 1130 and wireless communications subsystem 1133 may include one or more input and/or output communication interfaces to permit data to be exchanged with a data network, other computer systems, and/or any other devices described herein. Moreover, wired communications subsystem 1130 and/or wireless communications subsystem 1133 may permit computing system 1100 to determine RTT via uplink (UL) multiple-input multiple-output (MIMO) processes.

Similar to wireless device 1000 of FIG. 10, computer system 1100 of FIG. 11 may include a clock 1150 on bus 1105, which can generate a signal to synchronize the various components on bus 1105. Clock 1150 may include an LC oscillator, a crystal oscillator, a ring oscillator, a digital clock generator such as a clock divider or clock multiplexer, a phase locked loop, or other clock generator. The clock may be synchronized (or substantially synchronized) with corresponding clocks on other wireless devices while performing the techniques described herein. Clock 1150 may be driven by wireless communication subsystem 1133, which may be used to synchronize clock 1150 of computer system 1100 to one or more other devices.

Computing system 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like. For instance, storage device(s) 1125 may include a database 1127 (or other data structure) configured to store timestamp values as described in embodiments herein, which may be provided to APs and/or other devices via wired communications subsystem 1130 or wireless communications subsystem 1133.

In many embodiments, computing system 1100 may further comprise a working memory 1135, which can include a RAM or ROM device, as described above. Software elements, shown as being currently located within working memory 1135, can include an operating system 1140, device drivers, executable libraries, and/or other code, such as one or more application programs 1145, which may comprise software programs provided by various embodiments, and/or may be designed to implement methods, and/or configure systems, provided by other embodiments, as described herein, such as some or all of the methods described in relation to FIGS. 2-9. Merely by way of example, one or more procedures described with respect to the method(s) discussed above might be implemented as code and/or instructions executable by a computer (and/or a processor within a computer). In an aspect, such code and/or instructions can be used to configure and/or adapt a general purpose computer (or other device) to perform one or more operations in accordance with the described methods.

A set of these instructions and/or code might be stored on a non-transitory computer-readable storage medium, such as non-transitory storage device(s) 1125 described above. In some cases, the storage medium might be incorporated within a computer system, such as computing system 1100. In other embodiments, the storage medium might be separate from a computer system (e.g., a removable medium, such as a flash drive), and/or provided in an installation package, such that the storage medium can be used to program, configure, and/or adapt a general purpose computer with the instructions/code stored thereon. These instructions might take the form of executable code, which is executable by computing system 1100 and/or might take the form of source and/or installable code, which, upon compilation and/or installation on computing system 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the embodiments described herein. Also, a number of steps may be undertaken before, during, or after the above elements are considered. Accordingly, the above description does not limit the scope of the disclosure.

What is claimed is:

1. A method of timing synchronization between a first wireless device and a second wireless device, the method comprising:
    sending, by the first wireless device, a first message to the second wireless device;
    obtaining, by the first wireless device, a first timestamp at the first wireless device;
    receiving, by the first wireless device, a fine timing measurement frame from the second wireless device in response to the first message, the fine timing measurement frame including at least a part of a second timestamp from the second wireless device, wherein the second timestamp corresponds to a timing synchronization function (TSF) timer value for synchronization with the second wireless device; and
    synchronizing the first wireless device to the second wireless device, in response to determining that the first wireless device is not synchronized to the second wireless device based at least partially on the part of the second timestamp and the first timestamp.

2. The method of claim 1, wherein synchronizing the first wireless device to the second wireless device includes:
    adjusting a clock on the first wireless device based at least partially on the part of the second timestamp.

3. The method of claim 1, wherein the first message is a fine timing measurement request frame.

4. The method of claim 1, wherein:
    the first timestamp is based on a time of departure of the first message from the first wireless device; and
    the second timestamp is based on a time of arrival of the first message at the second wireless device.

5. The method of claim 1, further comprising:
    receiving, by the first wireless device, a second message from the second wireless device in response to the first message,
    wherein the first timestamp is based on a time of arrival of the second message at the first wireless device; and
    wherein the second timestamp is based on a time of departure of the second message from the second wireless device.

6. The method of claim 5, wherein the second message is an acknowledgement frame.

7. The method of claim 1, wherein:
    the first timestamp is based on a time of arrival of the fine timing measurement frame at the first wireless device; and
    the second timestamp is based on a time of departure of the fine timing measurement frame from the second wireless device.

8. The method of claim 1, wherein the fine timing measurement frame includes one of 2, 3, 4, 5, or 8 octets of the second timestamp.

9. The method of claim 1, wherein the fine timing measurement frame includes a reserved bit indicating that timestamp information is present in the fine timing measurement frame.

10. The method of claim 1, wherein determining that the first wireless device is not synchronized to the second wireless device is further based on a round trip time between the first wireless device and the second wireless device.

11. A wireless device comprising:
    a memory;
    a clock;
    a wireless communication subsystem configured to:
        send a first message to a second wireless device; and
        receive a fine timing measurement frame from the second wireless device in response to the first message, the fine timing measurement frame including at least a part of a first timestamp from the second wireless device, wherein the first timestamp corresponds to a timing synchronization function (TSF) timer value for synchronization with the second wireless device; and
    a processing unit communicatively coupled with the memory, the clock and the wireless communication subsystem, the processing unit being configured to:
        obtain a second timestamp at the wireless device; and
        synchronize the wireless device to the second wireless device, in response to determining that the wireless device is not synchronized to the second wireless device based at least partially on the part of the first timestamp and the second timestamp.

12. The wireless device of claim 11, wherein the processing unit is configured to synchronize the wireless device to the second wireless device by:
    adjusting the clock based at least partially on the part of the first timestamp.

13. The wireless device of claim 11, wherein the first message is a fine timing measurement request frame.

14. The wireless device of claim 11, wherein:
    the first timestamp is based on a time of arrival of the first message at the second wireless device; and
    the second timestamp is based on a time of departure of the first message from the wireless device.

15. The wireless device of claim 11, wherein:
    the wireless communication subsystem is further configured to receive a second message from the second wireless device in response to the first message;
    the first timestamp is based on a time of departure of the second message from the second wireless device;
    the second timestamp is based on a time of arrival of the second message at the wireless device; and
    the second message is an acknowledgement frame.

16. The wireless device of claim 11, wherein:
    the first timestamp is based on a time of departure of the fine timing measurement frame from the second wireless device; and
    the second timestamp is based on a time of arrival of the fine timing measurement frame at the wireless device.

17. The wireless device of claim 11, wherein the fine timing measurement frame includes one of 2, 3, 4, 5, or 8 octets of the first timestamp.

18. The wireless device of claim 11, wherein the fine timing measurement frame includes a reserved bit indicating that timestamp information is present in the fine timing measurement frame.

19. A non-transitory computer readable storage medium including machine-readable instructions stored thereon for synchronizing a first wireless device to a second wireless device, the instructions, when executed by one or more processors, causing the first wireless device to:
    send a first message to the second wireless device;
    obtain a first timestamp at the first wireless device;
    receive a fine timing measurement frame from the second wireless device in response to the first message, the fine timing measurement frame including at least a part of a second timestamp from the second wireless device, wherein the second timestamp corresponds to a timing synchronization function (TSF) timer value for synchronization with the second wireless device; and synchronize the first wireless device to the second wireless device, in response to determining that the first wireless device is not synchronized to the second wireless device based at least partially on the part of the second timestamp and the first timestamp.

20. The non-transitory computer readable storage medium of claim 19, wherein the instructions, when executed by one or more processors, cause the first wireless device to synchronize the first wireless device to the second wireless device by:

adjust a clock on the first wireless device based at least partially on the part of the second timestamp.

21. The non-transitory computer readable storage medium of claim 19, wherein:

the first timestamp is based on a time of departure of the first message from the first wireless device; and the second timestamp is based on a time of arrival of the first message at the second wireless device.

22. The non-transitory computer readable storage medium of claim 19, wherein the instructions, when executed by one or more processors, further cause the first wireless device to:

receive a second message from the second wireless device in response to the first message, wherein the first timestamp is based on a time of arrival of the second message at the first wireless device;

wherein the second timestamp is based on a time of departure of the second message from the second wireless device; and wherein the second message is an acknowledgement frame.

23. The non-transitory computer readable storage medium of claim 19, wherein:

the first timestamp is based on a time of arrival of the fine timing measurement frame at the first wireless device; and the second timestamp is based on a time of departure of the fine timing measurement frame from the second wireless device.

24. The non-transitory computer readable storage medium of claim 19, wherein the fine timing measurement frame includes one of 2, 3, 4, 5, or 8 octets of the second timestamp.

25. The non-transitory computer readable storage medium of claim 19, wherein the fine timing measurement frame includes a reserved bit indicating that timestamp information is present in the fine timing measurement frame.

26. An apparatus comprising:

means for sending a first message from a first wireless device to a second wireless device;

means for capturing a first timestamp at the first wireless device;

means for receiving a fine timing measurement frame from the second wireless device in response to the first message, the fine timing measurement frame including at least a part of a second timestamp from the second wireless device, wherein the second timestamp corresponds to a timing synchronization function (TSF) timer value for synchronization with the second wireless device; and means for synchronizing the first wireless device to the second wireless device, in response to determining that the first wireless device is not synchronized to the second wireless device based at least partially on the part of the second timestamp and the first timestamp.

27. The apparatus of claim 26, wherein the means for synchronizing the first wireless device to the second wireless device includes:

means for adjusting a clock on the first wireless device based at least partially on the part of the second timestamp.

28. The apparatus of claim 26, wherein:

the first timestamp is based on a time of departure of the first message from the first wireless device; and the second timestamp is based on a time of arrival of the first message at the second wireless device.

29. The apparatus of claim 26, further comprising:

means for receiving a second message from the second wireless device in response to the first message, wherein the first timestamp is based on a time of arrival of the second message at the first wireless device;

wherein the second timestamp is based on a time of departure of the second message from the second wireless device; and wherein the second message is an acknowledgement frame.

30. The apparatus of claim 26, wherein:

the first timestamp is based on a time of arrival of the fine timing measurement frame at the first wireless device; and the second timestamp is based on a time of departure of the fine timing measurement frame from the second wireless device.

31. The apparatus of claim 26, wherein the fine timing measurement frame includes one of 2, 3, 4, 5, or 8 octets of the second timestamp.

* * * * *